(12) United States Patent
Masumura

(10) Patent No.: US 11,773,258 B2
(45) Date of Patent: Oct. 3, 2023

(54) FLAME-RETARDANT POLYCARBONATE RESIN COMPOSITION

(71) Applicant: TEIJIN LIMITED, Osaka (JP)

(72) Inventor: Kento Masumura, Osaka (JP)

(73) Assignee: TEIJIN LIMITED, Osaka (JP)

( * ) Notice: Subject to any disclaimer, the term of this patent is extended or adjusted under 35 U.S.C. 154(b) by 213 days.

(21) Appl. No.: 17/279,390

(22) PCT Filed: Sep. 5, 2019

(86) PCT No.: PCT/JP2019/035038
§ 371 (c)(1),
(2) Date: Mar. 24, 2021

(87) PCT Pub. No.: WO2020/066535
PCT Pub. Date: Apr. 2, 2020

(65) Prior Publication Data
US 2022/0112369 A1   Apr. 14, 2022

(30) Foreign Application Priority Data

Sep. 26, 2018 (JP) .................. 2018-180115
Oct. 12, 2018 (JP) .................. 2018-193418

(51) Int. Cl.
*C08L 69/00* (2006.01)

(52) U.S. Cl.
CPC ......... *C08L 69/00* (2013.01); *C08L 2205/035* (2013.01)

(58) Field of Classification Search
CPC .... C08L 69/00; C08L 2205/035; C08L 25/12; C08L 27/18; C08L 51/04; C08K 3/346; C08K 5/5399
See application file for complete search history.

(56) References Cited

U.S. PATENT DOCUMENTS

| | | |
|---|---|---|
| RE36,188 E | 4/1999 | Gosens et al. |
| 2002/0115759 A1 | 8/2002 | Eckel et al. |
| 2004/0152910 A1 | 8/2004 | Fukuoka et al. |
| 2012/0301766 A1 | 11/2012 | Monden et al. |
| 2015/0086856 A1 | 3/2015 | Tomita et al. |
| 2015/0307707 A1 | 10/2015 | Jung et al. |

FOREIGN PATENT DOCUMENTS

| | | |
|---|---|---|
| CN | 101684194 | 3/2010 |
| CN | 101792582 | 8/2010 |
| CN | 107383829 | 11/2017 |
| JP | H2-115262 | 4/1990 |
| JP | H2-199162 | 8/1990 |
| JP | 2001-123056 | 5/2001 |
| JP | 2002-363194 | 12/2002 |
| JP | 2007-211112 | 8/2007 |
| JP | 2009-203269 | 9/2009 |
| JP | 2011-116927 | 6/2011 |
| JP | 2015131876 A * | 7/2015 |
| JP | 2015-537096 | 12/2015 |
| WO | 2012/067108 | 5/2012 |

OTHER PUBLICATIONS

International Search Report dated Oct. 8, 2019 in International (PCT) Application No. PCT/JP2019/035038.

* cited by examiner

*Primary Examiner* — Marc S Zimmer
*Assistant Examiner* — Surbhi Mdu
(74) *Attorney, Agent, or Firm* — Wenderoth, Lind & Ponack, L.L.P.

(57) ABSTRACT

An object of the present invention is to provide a polycarbonate resin composition which satisfies mechanical properties, flame retardancy, and appearance of molded articles at a higher level. The flame-retardant polycarbonate resin composition of the present disclosure contains, based on 100 parts by weight of a resin component consisting of (A) 40 to 100 parts by weight of a polycarbonate resin (component A) and (B) 60 to 0 parts by weight of a polyester resin (component B), (CI) 0 to 30 parts by weight of a polymer obtained by polymerizing at least one selected from the group consisting of an aromatic vinyl monomer, a vinyl cyanide monomer, and an alkyl (meth) acrylate monomer (component CI), (CII) 1 to 10 parts by weight of an impact modifier other than the component CI (component CII), (D) 1 to 20 parts by weight of phosphazene having 98.5 mol % or more of phosphazene cyclic trimer (component D), and (E) 0.05 to 2 parts by weight of dripping inhibitor (component E).

6 Claims, No Drawings

FLAME-RETARDANT POLYCARBONATE RESIN COMPOSITION

FIELD

The present disclosure relates to a flame-retardant polycarbonate resin composition and a molded article thereof. More particularly, the present disclosure relates to a polycarbonate resin composition in which mechanical properties, flame retardancy, and appearance of molded articles are improved by adding a specific impact modifier, a phosphazene having 98.5 mol % or more of a phosphazene cyclic trimer, and a dripping inhibitor to a resin component comprising a polycarbonate resin. Further, the present disclosure relates to a flame-retardant polycarbonate resin composition in which chemical resistance is improved in addition to mechanical properties, flame retardancy and appearance of molded articles. Further, the present disclosure also relates to a flame-retardant polycarbonate resin composition in which fluidity is improved in addition to mechanical properties, flame retardancy and appearance of molded articles.

BACKGROUND

Since an aromatic polycarbonate resin has excellent mechanical properties and thermal characteristics, it is used in various applications, mainly in the OA equipment and the electronic and electrical equipment field by adding a flame retardancy to the resin. Recently, with applications such as OA equipment and home appliances becoming thinner and lighter, there is an increasing demand for a resin material having high impact resistance, high flame retardancy and excellent appearance of molded articles. In order to meet these demands, in the field of the aromatic polycarbonate resin, studies has been conducted for a resin material which has high impact resistance and excellent molded appearance while satisfying the requirement of flame retardancy in reduced thickness as per a necessary safety-standard UL94.

As a method for imparting high flame retardancy to the aromatic polycarbonate resin, a combination of a halogen-based flame-retardant agent such as bromine compound and a flame-retardant aid such as antimony trioxide has been generally used (see Patent Document 1). However, in recent years, in consideration of the problem of generation of harmful substances during combustion of the halogen-based compound, researches for imparting flame retardancy using organophosphorus-based flame-retardant agent free of halogen-based compound having bromine have become active. For example, a number of compositions have been proposed, in which organophosphorus-based flame-retardant agent as well as polytetrafluoroethylene having a fibril-forming ability are added to the aromatic polycarbonate resin. Related findings thereof are widely known (see Patent Document 2). Further, as a solution to improve the toughness of the aromatic polycarbonate resin, a method of adding impact modifier such as graft polymer is known (see Patent Document 3). In general, addition of the flame-retardant agent accompanies the deterioration of mechanical properties, and addition of the impact modifier accompanies the deterioration of flame retardancy. Therefore, by balancing the amount of the flame-retardant agent and the amount of the impact modifier, a resin composition having a certain level of mechanical properties and flame retardancy has been provided (see Patent Document 4). Further, it was reported that purity of phosphazene affects the characteristics of the resin composition (see Patent Document 5).

RELATED ART

Patent Literature

[Patent Document 1] JP-A-H2-199162
[Patent Document 2] JP-A-H2-115262
[Patent Document 3] JP-A-2009-203269
[Patent Document 4] JP-A-2001-123056
[Patent Document 5] JP-T-2015-537096

SUMMARY

Problems to be Solved by the Invention

Currently, resin compositions having excellent impact resistance and excellent appearance of molded articles while achieving UL94 5VB in reduced thickness have not been obtained. In addition, even when phosphazene of purity known in the prior art is used, flame retardancy is still insufficient.

In view of the above, it is an object of the present disclosure to provide a polycarbonate resin composition which satisfies excellent mechanical properties, flame retardancy and appearance of molded articles at a higher level.

Solution to the Problem

As a result of extensive studies to solve the above problems, the present inventors have found a method of obtaining a polycarbonate resin composition having improved mechanical properties, flame retardancy, and appearance of molded articles, by adding a specific impact modifier, a phosphazene having 98.5 mol % or more of a phosphazene cyclic trimer and a dripping inhibitor to a resin component comprising a polycarbonate resin, and have completed the present invention.

Namely, the present inventors have found that the above-mentioned problems are solved by the flame-retardant polycarbonate resin composition and the molded article thereof described below.

Embodiment 1

A flame-retardant polycarbonate resin composition characterized in that it comprises, based on 100 parts by weight of a resin component consisting of (A) 40 to 100 parts by weight of a polycarbonate resin (component A) and (B) 60 to 0 parts by weight of a polyester resin (component B), (CI) 0 to 30 parts by weight of a polymer obtained by polymerizing at least one selected from the group consisting of an aromatic vinyl monomer, a vinyl cyanide monomer, and an alkyl (meth) acrylate monomer (component CI), (CII) 1 to 10 parts by weight of an impact modifier other than the component CI (component CII), (D) 1 to 20 parts by weight of phosphazene having 98.5 mol % or more of phosphazene cyclic trimer (component D), and (E) 0.05 to 2 parts by weight of a dripping inhibitor (component E).

Embodiment 2

The flame-retardant polycarbonate resin composition according to the embodiment 1, wherein 100 parts by weight of the resin component consists of (A) 40 to 95 parts by weight of a polycarbonate resin (component A) and (B) 60 to 5 parts by weight of a polyester resin (component B).

Embodiment 3

The flame-retardant polycarbonate resin composition according to the embodiment 1, wherein it comprises 1 to 30 parts by weight of the component CI, based on 100 parts by weight of the resin component.

Embodiment 4

The flame-retardant polycarbonate resin composition according to any one of the embodiments 1 to 3, characterized in that the component CII is a graft copolymer obtained by graft polymerization of at least one compound containing (meth) acrylic ester compound to a rubber selected from the group consisting of a butadiene-based rubber, an acrylic rubber and a silicone-acrylate composite rubber.

Embodiment 5

The flame-retardant polycarbonate resin composition according to any one of the embodiments 1 to 4, characterized in that it comprises (F) 0.1 to 50 parts by weight of a silicate mineral (component F), based on 100 parts by weight of the resin component.

Embodiment 6

A molded article formed of the flame-retardant polycarbonate resin composition according to any one of the embodiments 1 to 5.

Advantageous Effects of Invention

According to the flame-retardant polycarbonate resin composition of the present disclosure, it is possible to provide a polycarbonate resin composition which satisfies excellent mechanical properties, flame retardancy, and appearance of molded articles at a higher level.

DESCRIPTION OF EMBODIMENTS

The details of the inventions according to the present disclosure are described below.
<<Flame-Retardant Polycarbonate Resin Composition>>
The flame-retardant polycarbonate resin composition according to the present disclosure comprises, based on 100 parts by weight of a resin component consisting of (A) 40 to 100 parts by weight of a polycarbonate resin (component A) and (B) 60 to 0 parts by weight of a polyester resin (component B), (CI) 0 to 30 parts by weight of a polymer obtained by polymerizing at least one selected from the group consisting of an aromatic vinyl monomer, a vinyl cyanide monomer, and an alkyl (meth) acrylate monomer (component CI), (CII) 1 to 10 parts by weight of an impact modifier other than the component CI (component CII), (D) 1 to 20 parts by weight of phosphazene having 98.5 mol % or more of phosphazene cyclic trimer (component D), and (E) 0.05 to 2 parts by weight of a dripping inhibitor (component E).

The resin composition according to the present disclosure comprises phosphazene having 98.5 mol % or more of phosphazene cyclic trimer in addition to a polycarbonate resin, a specific impact modifier and a dripping inhibitor, thereby exhibiting excellent flame retardancy as well as excellent mechanical properties and excellent appearance of molded articles. Although the underlying mechanisms of this effect is not fully understood, a possible mechanism is as follows: in the resin composition according to the present disclosure, since the phosphazene contains 98.5 mol % or more of phosphazene cyclic trimer, the amount of phosphazene cyclic tetramer is relatively reduced. It is considered that the phosphazene cyclic tetramer inhibits the combustion suppression effect (carbonized layer formation) by the cyclic trimer. Therefore, it is considered that, as a result, the polycarbonate resin composition according to the present disclosure has improved flame retardancy.
<Resin Component>
The flame-retardant polycarbonate resin composition according to the present disclosure comprises a resin component consisting of (A) 40 to 100 parts by weight of a polycarbonate resin (component A) and (B) 60 to 0 parts by weight of a polyester resin (component B).
(Component A: Polycarbonate Resin)
polycarbonate resin used in the present disclosure is obtained by reacting a dihydric phenol with a carbonate precursor. Examples of the reaction include interfacial polycondensation, melt transesterification, solid-phase transesterification of a carbonate prepolymer, and ring-opening polymerization of cyclic carbonate compounds.

Typical examples of the dihydric phenol used herein include hydroquinone, resorcinol, 4,4'-biphenol, 1,1-bis(4-hydroxyphenyl)ethane, 2,2-bis(4-hydroxyphenyl)propane (commonly known as "bisphenol A"), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, bis(4-hydroxy-3-methylphenyl)sulfide, 9,9-bis(4-hydroxyphenyl)fluorene and 9,9-bis(4-hydroxy-3-methylphenyl)fluorene. Preferred dihydric phenol is bis(4-hydroxyphenyl)alkanes, and among them, bisphenol A is particularly preferred from the viewpoint of impact resistance and commonly used.

In the present disclosure, although bisphenol A-based polycarbonates, which are general-purpose polycarbonates, may be used, special polycarbonates produced by using other dihydric phenols may also be used as the component A.

For example, polycarbonates (homopolymers or copolymers) obtained by using 4,4'-(m-phenylenediisopropylidene)diphenol (may be abbreviated as "BPM" hereinafter), 1,1-bis(4-hydroxyphenyl)cyclohexane, 1,1-bis(4-hydroxyphenyl)-3,3,5-trimethylcyclohexane (may be abbreviated as "Bis-TMC" hereinafter), 9,9-bis(4-hydroxyphenyl)fluorene and 9,9-bis(4-hydroxy-3-methylphenyl)fluorene (may be abbreviated as "BCF" hereinafter) as part or all of the dihydric phenol component are suitable for use in fields in which the requirements for dimensional stability and form stability against water absorption are very strict. These dihydric phenols other than BPA are used in an amount of preferably not less than 5 mol %, particularly preferably not less than 10 mol % based on the whole dihydric phenol component constituting the polycarbonate.

In particular, when high rigidity and better resistance to hydrolysis are required, the component A constituting the resin composition is particularly preferably the following copolycarbonates (1) to (3).

(1) A copolycarbonate which comprises 20 to 80 mol % (more preferably 40 to 75 mol %, even more preferably 45 to 65 mol %) of BPM and 20 to 80 mol % (more preferably 25 to 60 mol %, even more preferably 35 to 55 mol %) of BCF based on 100 mol % of the dihydric phenol component constituting the polycarbonate.

(2) A copolycarbonate which comprises 10 to 95 mol % (more preferably 50 to 90 mol %, even more preferably 60 to 85 mol %) of BPA and 5 to 90 mol % (more preferably 10 to 50 mol %, even more preferably 15 to 40 mol %) of BCF based on 100 mol % of the dihydric phenol component constituting the polycarbonate.

(3) A copolycarbonate which comprises 20 to 80 mol % (more preferably 40 to 75 mol %, even more preferably 45 to 65 mol %) of BPM and 20 to 80 mol % (more preferably 25 to 60 mol %, even more preferably 35 to 55 mol %) of Bis-TMC based on 100 mol % of the dihydric phenol component constituting the polycarbonate.

These special polycarbonates may be used alone, or used in combination by appropriately mixing two or more thereof. They may also be used by mixing with a commonly used bisphenol-A-based polycarbonate.

The production processes and characteristic properties of these special polycarbonates are detailed in, for example, JP-H06-172508A, JP-H08-27370A, JP-2001-55435A and JP2002-117580A.

Out of the above polycarbonates, polycarbonates whose water absorption coefficient and Tg (glass transition temperature) have been adjusted to the following ranges by controlling their copolymer compositions, etc., are excellent in the hydrolysis resistance of the polymer itself and rarely warp after molding. Therefore, they are particularly preferred in fields in which dimensional stability is required.

(i) A polycarbonate having a water absorption coefficient of 0.05% to 0.15%, preferably 0.06% to 0.13%, and a Tg of 120° C. to 180° C., or (ii) a polycarbonate having a Tg of 160° C. to 250° C., preferably 170° C. to 230° C., and a water absorption coefficient of 0.10% to 0.30%, preferably 0.13% to 0.30%, more preferably 0.14% to 0.27%.

The water absorption coefficient of the polycarbonate is a value obtained by measuring the moisture content of a disk-like test piece having a diameter of 45 mm and a thickness of 3.0 mm in accordance with ISO62-1980 after the test piece is immersed in 23° C. water for 24 hours. Tg (glass transition temperature) is a value obtained by a measurement with a differential scanning calorimeter (DSC) in accordance with JIS K7121.

The carbonate precursor includes a carbonyl halide, diester carbonate and haloformate, and are exemplified by phosgene, diphenyl carbonate or dihaloformates of a dihydric phenol.

For the production of the aromatic polycarbonate resin by the interfacial polymerization of said dihydric phenols and carbonate precursors, a catalyst, an end sealing agent and an antioxidant for preventing the oxidation of the dihydric phenol may be optionally used if necessary. The aromatic polycarbonate resin of the present disclosure includes a branched polycarbonate resin obtained by copolymerizing a polyfunctional aromatic compound having 3 or more functional groups, a polyester carbonate resin obtained by copolymerizing an aromatic or aliphatic (including alicyclic) bifunctional carboxylic acid, a copolycarbonate resin obtained by copolymerizing a bifunctional alcohol (including alicyclic), and a polyester carbonate resin obtained by copolymerizing the bifunctional carboxylic acid and the bifunctional alcohol. It may also be a mixture of two or more of the obtained aromatic polycarbonate resins.

The branched polycarbonate resin can impart anti-dripping properties etc., to the resin composition of the present disclosure. Examples of the polyfunctional aromatic compound having 3 or more functional groups used in the branched polycarbonate resin include phloroglucin, phloroglucide, 4,6-dimethyl-2,4,6-tris(4-hydroxydiphenyl)heptene-2, 2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol, 4-{4-[1,1-bis(4-hydroxyphenyl)ethyl]benzene}α,α-dimethylbenzylphenol and other trisphenols, tetra(4-hydroxyphenyl)methane, bis(2,4-dihydroxyphenyl)ketone, 1,4-bis(4,4-dihydroxytriphenylmethyl)benzene, trimellitic acid, pyromellitic acid, benzophenone tetracarboxylic acid and acid chlorides thereof. Out of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

The content of a constituent unit derived from the polyfunctional aromatic compound in the branched polycarbonate is preferably 0.01 mol % to 1 mol %, more preferably 0.05 mol % to 0.9 mol %, much more preferably 0.05 mol % to 0.8 mol % based on 100 mol % of the total of the constituent unit derived from the dihydric phenol and the constituent unit derived from the polyfunctional aromatic compound.

Further, in particular in the case of the melt transesterification process, a branched structure unit may be produced as a side reaction. As for such a branched structure unit, the content thereof is preferably 0.001 mol % to 1 mol %, more preferably 0.005 mol % to 0.9 mol %, much more preferably 0.01 mol % to 0.8 mol % based on 100 mol % of the total of this unit and the constituent unit derived from the dihydric phenol. The percentage of the branched structure can be calculated by $^1$H-NMR measurement.

The aliphatic bifunctional carboxylic acid is preferably α,ω-dicarboxylic acid. Preferred examples of the aliphatic bifunctional carboxylic acid include linear saturated aliphatic dicarboxylic acids such as sebacic acid (decanedioic acid), dodecanedioic acid, tetradecanedioic acid, octadecanedioic acid and icosanedioic acid, and alicyclic dicarboxylic acids such as cyclohexanedicarboxylic acid. The bifunctional alcohol is preferably an alicyclic diol such as cyclohexanedimethanol, cyclohexanediol and tricyclodecanedimethanol.

Methods for manufacturing the polycarbonate resin of the present disclosure include reaction systems such as interfacial polymerization, melt transesterification, the solid-phase transesterification of carbonate prepolymer and the ring-opening polymerization of cyclic carbonate compound, and these methods are well known from various documents and patent publications.

For the production of the flame-retardant polycarbonate resin composition of the present disclosure, the viscosity average molecular weight (M) of the polycarbonate resin is not limited but preferably $1.8 \times 10^4$ to $4.0 \times 10^4$, more preferably $2.0 \times 10^4$ to $3.5 \times 10^4$, much more preferably $2.2 \times 10^4$ to $3.0 \times 10^4$. When the viscosity average molecular weight of the polycarbonate resin is $1.8 \times 10^4$ or more, satisfactory mechanical properties may be obtained. On the other hand, the resin composition obtained from the polycarbonate resin with the viscosity average molecular weight of $4.0 \times 10^4$ or less may have excellent versatility in terms of better fluidity at the time of the injection molding.

The above-described polycarbonate resin may be obtained by mixing a polycarbonate resin having a viscosity average molecular weight outside the above range. Particularly, a polycarbonate resin having a viscosity average molecular weight higher than the above range ($5.0 \times 10^4$) improves the entropy elasticity of the resin. As a result, it exhibits high moldability in gas-assist molding and foam molding which can be used to mold a reinforced resin material into a structural member. In this case, the moldability is further improved compared to the above-described branched polycarbonate. As a more preferred example, a polycarbonate resin (component A-1-1)(maybe referred to as "high-molecular weight component-containing polycarbonate resin" hereinafter) which consists of a polycarbonate resin having a viscosity average molecular weight of $7 \times 10^4$ to $3 \times 10^5$ (component A-1-1-1) and an aromatic polycarbonate resin having a viscosity average molecular weight of $1 \times 10^4$ to $3 \times 10^4$ (component A-1-1-2) and has a viscosity average molecular weight of $1.6 \times 10^4$ to $3.5 \times 10^4$ may also be used as the component A.

In the above high-molecular weight component-containing polycarbonate resin (component A-1-1), the molecular weight of the component A-1-1-1 is preferably $7 \times 10^4$ to $2 \times 10^5$, more preferably $8 \times 10^4$ to $2 \times 10^5$, much more preferably $1 \times 10^5$ to $2 \times 10^5$, particularly preferably $1 \times 10^5$ to $1.6 \times 10^5$. The molecular weight of the component A-1-1-2 is preferably $1 \times 10^4$ to $2.5 \times 10^4$, more preferably $1.1 \times 10^4$ to $2.4 \times 10^4$, much more preferably $1.2 \times 10^4$ to $2.4 \times 10^4$, particularly preferably $1.2 \times 10^4$ to $2.3 \times 10^4$.

The high-molecular weight component-containing polycarbonate resin (component A-1-1) can be obtained by mixing together the above components A-1-1-1 and A-1-1-2 in various ratios and adjusting the ratio to satisfy a predetermined molecular weight range. The content of the component A-1-1-1 is preferably 2 wt % to 40 wt %, more preferably 3 wt % to 30 wt %, much more preferably 4 wt % to 20 wt %, particularly preferably 5 wt % to 20 wt % based on 100 wt % of the component A-1-1.

To prepare the component A-1-1, following methods may be employed: (1) a method in which the component A-1-1-1 and the component A-1-1-2 are polymerized independently and then mixed together, (2) a method in which an aromatic polycarbonate resin is produced by employing a method of producing an aromatic polycarbonate resin showing a plurality of polymer peaks in a molecular weight distribution chart by GPC method in the same system, as typified by the method disclosed in JP-H05-306336A, ensuring that the aromatic polycarbonate resin satisfies the condition of the component A-1-1 of the present disclosure, or (3) a method in which the aromatic polycarbonate resin obtained by the above production method (the method according to (2)) is mixed with the component A-1-1-1 and/or the component A-1-1-2 produced separately.

Regarding the viscosity average molecular weight of the present disclosure, a specific viscosity ($\eta_{sp}$) is calculated based on the following equation from a solution prepared by dissolving 0.7 g of the polycarbonate in 100 ml of methylene chloride at 20° C. with an Ostwald viscometer:

Specific viscosity $(\eta_{sp})=(t-t_0)/t_0$

[$t_0$ is a time (seconds) required for the dropping of methylene chloride and t is a time (seconds) required for the dropping of the sample solution]

and then the viscosity average molecular weight M is calculated from the obtained specific viscosity ($\eta_{sp}$), based on the following equation.

$\eta_{sp}/c=[\eta]+0.45 \times [\eta]^2 c$ ([$\eta$] is intrinsic viscosity)

$[\eta]=1.23 \times 10^{-4} M^{0.83}$ $c=0.7$

The viscosity average molecular weight of the polycarbonate resin in the flame-retardant polycarbonate resin composition of the present disclosure is calculated by the following procedure. Namely, the composition is mixed with methylene chloride in a weight ratio of 1:20 to 1:30 to dissolve soluble matter contained in the composition. The soluble matter is collected by celite filtration. Thereafter, the solvent contained in the obtained solution is removed. After the removal of the solvent, solid matter is dried completely so as to obtain a solid matter of a methylene chloride-soluble component. The specific viscosity at 20° C. is obtained as described above from a solution prepared by dissolving 0.7 g of the solid in 100 ml of methylene chloride, so as to calculate the viscosity average molecular weight M therefrom as described above.

It is also possible to use a polycarbonate-polydiorganosiloxane copolymer resin as the polycarbonate resin (component A) of the present disclosure. The polycarbonate-polydiorganosiloxane copolymer resin is preferably a copolymer resin composed of a polycarbonate block represented by the following general formula (1) and a polydiorganosiloxane block represented by the following general formula (3).

[Chem 1]

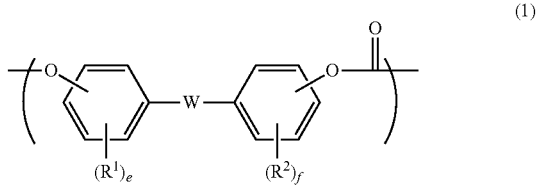
(1)

[In the above general formula (1), $R^1$ and $R^2$ are each independently a group selected from the group consisting of hydrogen atom, halogen atom, alkyl group having 1 to 18 carbon atoms, alkoxy group having 1 to 18 carbon atoms, cycloalkyl group having 6 to 20 carbon atoms, cycloalkoxy group having 6 to 20 carbon atoms, alkenyl group having 2 to 10 carbon atoms, aryl group having 6 to 14 carbon atoms, aryloxy group having 6 to 14 carbon atoms, aralkyl group having 7 to 20 carbon atoms, aralkyloxy group having 7 to 20 carbon atoms, nitro group, aldehyde group, cyano group and carboxyl group, when there are a plurality of $R^1$'s and a plurality of $R^2$'s, they may be the same or different, "e" and "f" are each an integer of 1 to 4, and "W" is a single bond or at least one group selected from the group consisting of groups represented by the following general formulas (2).]

[Chem 2]

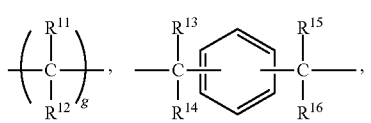
(2)

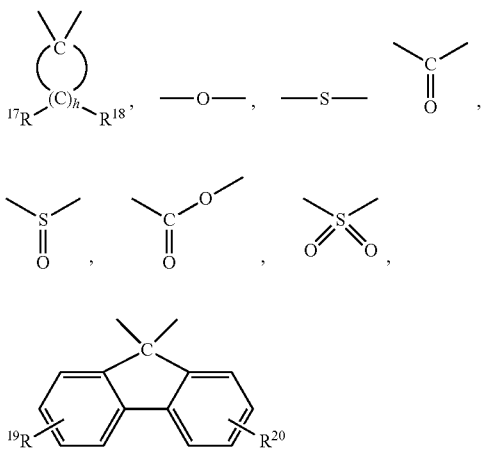

[In the above general formulas (2), $R^{11}$, $R^{12}$, $R^{13}$, $R^{14}$, $R^{15}$, $R^{16}$, $R^{17}$ and $R^{18}$ are each independently a group selected from the group consisting of hydrogen atom, alkyl group having 1 to 18 carbon atoms, aryl group having 6 to 14 carbon atoms and aralkyl group having 7 to 20 carbon atoms, $R^{19}$ and $R^{20}$ are each independently a group selected from the group consisting of hydrogen atom, halogen atom, alkyl group having 1 to 18 carbon atoms, alkoxy group having 1 to 10 carbon atoms, cycloalkyl group having 6 to 20 carbon atoms, cycloalkoxy group having 6 to 20 carbon atoms, alkenyl group having 2 to 10 carbon atoms, aryl group having 6 to 14 carbon atoms, aryloxy group having 6 to 10 carbon atoms, aralkyl group having 7 to 20 carbon atoms, aralkyloxy group having 7 to 20 carbon atoms, nitro group, aldehyde group, cyano group and carboxyl group, and, regarding each of $R^{11}$ to $R^{19}$, when there are plurality of them, they may be the same or different; "g" is an integer of 1 to 10, and "h" is an integer of 4 to 7.]

[Chem 3]

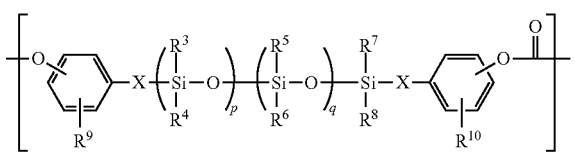

(3)

[In the above formula (3), $R^3$, $R^4$, $R^5$, $R^6$, $R^7$ and $R^8$ are each independently a hydrogen atom, alkyl group having 1 to 12 carbon atoms, or substituted or nonsubstituted aryl group having 6 to 12 carbon atoms, $R^9$ and $R^{10}$ are each independently hydrogen atom, halogen atom, alkyl group having 1 to 10 carbon atoms or alkoxy group having 1 to 10 carbon atoms, "p" is a natural number, "q" is 0 or natural number, and (p+q) is a natural number of 10 to 300. "X" is a divalent aliphatic group having 2 to 8 carbon atoms.]

The polycarbonate-polydiorganosiloxane copolymer resin (component A) used in the present disclosure may be preferably prepared by copolymerizing a dihydric phenol represented by the following general formula (4) and a hydroxyaryl-terminated polydiorganosiloxane represented by the following general formula (5).

[Chem 4]

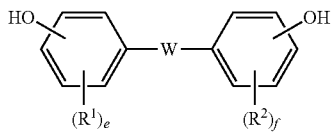

(4)

[(In the above general formula (4), $R^1$ and $R^2$ each independently represent a group selected from the group consisting of hydrogen atom, halogen atom, alkyl group having 1 to 18 carbon atoms, alkoxy group having 1 to 18 carbon atoms, cycloalkyl group having 6 to 20 carbon atoms, cycloalkoxy group having 6 to 20 carbon atoms, alkenyl group having 2 to 10 carbon atoms, aryl group having 6 to 14 carbon atoms, aryloxy group having 6 to 14 carbon atoms, aralkyl group having 7 to 20 carbon atoms, aralkyloxy group having 7 to 20 carbon atoms, nitro group, aldehyde group, cyano group and carboxyl group, when there are a plurality of $R^1$'s and a plurality of $R^2$'s, they may be the same or different, "e" and "f" are each an integer of 1 to 4, and "W" is a single bond or at least one group selected from the group consisting of groups represented by the above general formulas (2).)

[Chem 5]

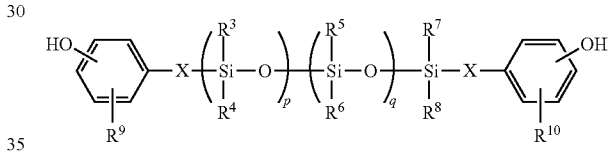

(5)

[In the above formula (5), $R^3$, $R^4$, $R^5$, $R^6$, $R^7$ and $R^8$ are each independently hydrogen atom, alkyl group having 1 to 12 carbon atoms, or substituted or non-substituted aryl group having 6 to 12 carbon atoms, $R^9$ and $R^{10}$ are each independently a hydrogen atom, halogen atom, alkyl group having 1 to 10 carbon atoms, or alkoxy group having 1 to 10 carbon atoms, "p" is a natural number, "q" is 0 or a natural number and (p+q) is a natural number of 10 to 300. "X" is a divalent aliphatic group having 2 to 8 carbon atoms.]

Examples of the dihydric phenol (1) represented by the general formula (4) include 4,4'-dihydroxybiphenyl, bis(4-hydroxyphenyl)methane, 1,1-bis(4-hydroxyphenyl)ethane, 1,1-bis(4-hydroxyphenyl)-1-phenylethane, 2,2-bis(4-hydroxyphenyl)propane, 2,2-bis(4-hydroxy-3-methylphenyl) propane, 1,1-bis(4-hydroxyphenyl)-3,3,5-trimethylcyclohexane, 2,2-bis(4-hydroxy-3,3'-biphenyl)propane, 2,2-bis (4-hydroxy-3-isopropylphenyl)propane, 2,2-bis(3-t-butyl-4-hydroxyphenyl)propane, 2,2-bis(4-hydroxyphenyl)butane, 2,2-bis(4-hydroxyphenyl)octane, 2,2-bis(3-bromo-4-hydroxyphenyl)propane, 2,2-bis(3,5-dimethyl-4-hydroxyphenyl)propane, 2,2-bis(3-cyclohexyl-4-hydroxyphenyl)propane, 1,1-bis(3-cyclohexyl-4-hydroxyphenyl)cyclohexane, bis(4-hydroxyphenyl)diphenylmethane, 9,9-bis(4-hydroxyphenyl)fluorene, 9,9-bis(4-hydroxy-3-methylphenyl)fluorene, 1,1-bis(4-hydroxyphenyl)cyclohexane, 1,1-bis(4-hydroxyphenyl)cyclopentane, 4,4'-dihydroxydiphenyl ether, 4,4'-dihydroxy-3,3'-dimethyldiphenyl ether, 4,4'-sulfonyldiphenol, 4,4'-dihydroxydiphenyl sulfoxide, 4,4'-dihydroxydiphenyl sulfide, 2,2'-dimethyl-4,4'-sulfonyldiphenol, 4,4'-dihydroxy-3,3'-dimethyldiphenyl sulfoxide, 4,4'-dihydroxy-3,3'-dimethyldiphenyl sulfide, 2,2'-diphenyl-4,4'-sulfonyl diphenol, 4,4'-dihydroxy-3,3'-diphenyldiphenyl sulfoxide, 4,4'-dihydroxy-3,3'-diphenyldiphenyl sulfide, 1,3-bis{2-(4-hydroxyphenyl)propyl}benzene, 1,4-bis(2-(4-hydroxyphenyl)propyl)benzene, 1,4-bis(4-hydroxyphenyl)cyclohexane, 1,3-bis(4-hydroxyphenyl)cyclohexane, 4,8-bis(4-hydroxyphenyl)tricyclo[5.2.1.0²,⁶]decane, 4,4'-(1,3-adamantanediyl)diphenol and 1,3-bis(4-hydroxyphenyl)-5,7-dimethyladamantane.

Out of these, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)cyclohexane, 1,1-bis(4-hydroxyphenyl)-3,3,5-trimethylcyclohexane, 4,4'-sulfonyldiphenol, 2,2'-dimethyl-4,4'-sulfonyldiphenol, 9,9-bis(4-hydroxy-3-methylphenyl)fluorene, 1,3-bis{2-(4-hydroxyphenyl)propyl}benzene and 1,4-bis{2-(4-hydroxyphenyl)propyl}benzene are preferred. 2,2-bis(4-hydroxyphenyl)propane, 1,1-bis(4-hydroxyphenyl)cyclohexane (BPZ), 4,4'-sulfonyldiphenol and 9,9-bis(4-hydroxy-3-methylphenyl)fluorene are particularly preferred. 2,2-bis(4-hydroxyphenyl)propane, which has excellent strength and high durability, is most preferred. They may be used alone or in combination of two or more thereof.

As the hydroxyaryl-terminated polydiorganosiloxane represented by the above general formula (5), the following compounds are preferably used.

[Chem 6]

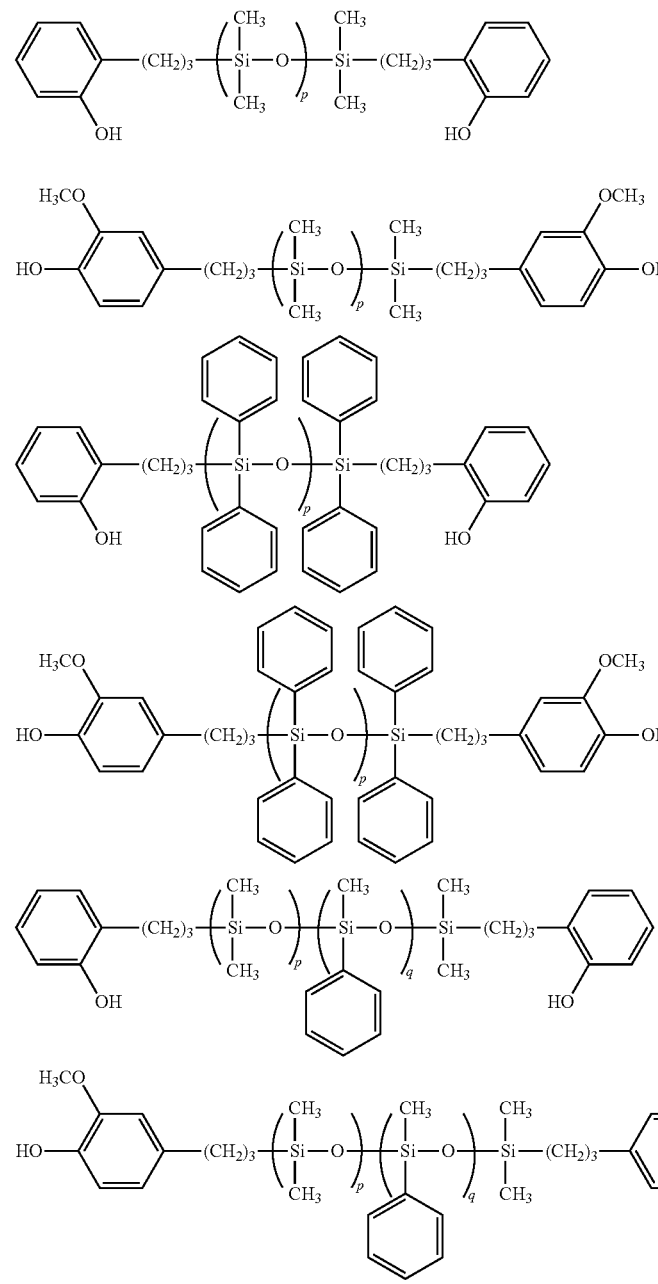

-continued

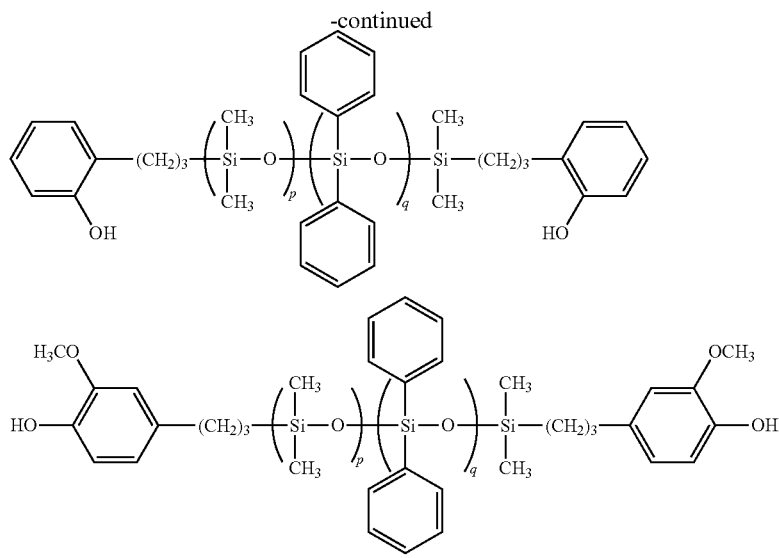

The hydroxyaryl-terminated polydiorganosiloxane (II) is easily produced by hydrosilylating a phenol having an olefinic unsaturated carbon-carbon bond, preferably vinyl phenol, 2-allylphenol, isopropenyl phenol or 2-methoxy-4-allylphenol to the end of a polysiloxane chain having a predetermined polymerization degree. In particular, (2-allylphenol)-terminated polydiorganosiloxanes and (2-methoxy-4-allylphenol)-terminated polydiorganosiloxanes are preferred, and (2-allylphenol)-terminated polydimethylsiloxane and (2-methoxy-4-allylphenol)-terminated polydimethylsiloxane are particularly preferred. The molecular weight distribution (Mw/Mn) of the hydroxyaryl-terminated polydiorganosiloxane (II) is preferably not more than 3. To develop more excellent low-outgas properties at the time of high-temperature molding and excellent impact resistance at low temperature, the molecular weight distribution (Mw/Mn) is more preferably not more than 2.5, much more preferably not more than 2. When the molecular weight distribution is within the above preferred range, the amount of gas generated at the time of high-temperature molding may be reduced, and excellent low-temperature impact resistance may be achieved.

The diorganosiloxane polymerization degree (p+q) of the hydroxyaryl-terminated polydiorganosiloxane (II) is suitably 10 to 300 to obtain high impact resistance. The diorganosiloxane polymerization degree (p+q) is preferably 10 to 200, more preferably 12 to 150, much more preferably 14 to 100. Within the above preferred range, impact resistance, which is characteristic of the polycarbonate-polydiorganosiloxane copolymer, develops effectively, and a satisfactory appearance is obtained.

The content of the polydiorganosiloxane is preferably 0.1 wt % to 50 wt % based on the total weight of the polycarbonate-polydiorganosiloxane copolymer resin used in the component A. The content of the polydiorganosiloxane component is more preferably 0.5 wt % to 30 wt %, much more preferably 1 wt % to 20 wt %. At or above the lower limit of the above preferred range, impact resistance and flame retardancy become excellent, and at or below the upper limit of the above preferred range, a stable appearance which is hardly affected by molding condition is readily obtained. The polymerization degree of the polydiorganosiloxane and the content of the polydiorganosiloxane can be calculated by $^1$H-NMR measurement.

In the present disclosure, hydroxyaryl-terminated polydiorganosiloxanes (II) may be used alone or in combination of two or more thereof.

As long as the effect of the present disclosure is not impeded, a comonomer other than the dihydric phenol (I) and the hydroxyaryl-terminated polydiorganosiloxane (II) may be used in combination in an amount of not more than 10 wt % based on the total weight of the copolymer.

In the present disclosure, a mixed solution containing an oligomer having a terminal chloroformate group is prepared in advance through a reaction between the dihydric phenol (I) and a carbonate ester-forming compound in a mixed solution of a water-insoluble organic solvent and an alkali aqueous solution.

To produce the oligomer of the dihydric phenol (I), the whole amount of the dihydric phenol (I) used in the present method may be converted to the oligomer at a time, or part thereof as a post-addition monomer may be added as a reaction raw material during the post-stage of the interfacial polycondensation reaction. The term "post-addition monomer" means that a monomer is added to facilitate the post-stage of the polycondensation reaction, and does not need to be added when not required.

The reaction system for this oligomer production is not particularly limited, but normally it is preferable to use a system in which the reaction is carried out in a solvent in the presence of an acid binder.

The percentage of the carbonate ester-forming compound may be suitably adjusted in consideration of the stoichiometric ratio (equivalent) of the reaction. When a gaseous carbonate ester-forming compound such as phosgene is used, it is preferably blown into the reaction system.

The acid binder include for example an alkali metal hydroxide such as sodium hydroxide or potassium hydroxide, an alkali metal carbonate such as sodium carbonate or potassium carbonate, an organic base such as pyridine, and a mixture thereof. The percentage of the acid binder may also be suitably determined in consideration of the stoichiometric ratio (equivalent) of the reaction, as stated above. Stated more specifically, 2 equivalents or a little more than that of the acid binder is preferably used based on the number of moles (1 mole is generally equivalent to 2 equivalents) of the dihydric phenol (I) used for the formation of the oligomer.

As the solvent, solvents which are inactive to various reactions, such as well-known solvents used to produce polycarbonates, may be used alone or as a mixture. Typical examples of the solvent include for example hydrocarbon solvents such as xylene and halogenated hydrocarbon solvents such as methylene chloride and chlorobenzene. Halogenated hydrocarbon solvents such as methylene chloride are particularly preferably used.

Although the reaction pressure for the oligomer production is not particularly limited and may be normal pressure, increased pressure or reduced pressure, the reaction is advantageously carried out under normal pressure. The reaction temperature is selected from a range of −20° C. to 50° C., and water cooling or ice cooling is desirably carried out as heat is generated by polymerization in most cases. Although the reaction time is affected by other conditions and cannot be specified unconditionally, it is generally 0.2 to 10 hours. The pH range of the reaction for the oligomer production is the same as the well-known interfacial reaction, and always adjusted to not less than 10.

Thus, in the present disclosure, the polycarbonate-polydiorganosiloxane copolymer is obtained by obtaining a mixed solution containing a oligomer of a dihydric phenol (I) having a terminal chloroformate group; adding to it a hydroxyaryl-terminated polydiorganosiloxane (II) represented by the general formula (5) which is highly purified to have a molecular weight distribution (Mw/Mn) of not more than 3, while stirring the mixed solution; and carrying out the interfacial polycondensation of the hydroxyaryl-terminated polydiorganosiloxane (II) and the oligomer.

For the interfacial polycondensation reaction, an acid binder may be suitably added in consideration of the stoichiometric ratio (equivalent) of the reaction. As the acid binder, for example, an alkali metal hydroxide such as sodium hydroxide or potassium hydroxide, an alkali metal carbonate such as sodium carbonate or potassium carbonate, an organic base such as pyridine, or a mixture thereof may be used. Stated more specifically, when the hydroxyaryl-terminated polydiorganosiloxane (II) or part of the dihydric phenol (I) is added as the post-addition monomer in this reaction stage as described above, 2 equivalents or more than that of an alkali is preferably used based on the total number of moles (1 mole is generally equivalent to 2 equivalents) of the post-added dihydric phenol (I) and hydroxyaryl-terminated polydiorganosiloxane (II).

Polycondensation by the interfacial polycondensation reaction between the oligomer of the dihydric phenol (I) and the hydroxyaryl-terminated polydiorganosiloxane (II) is carried out by stirring the above mixed solution violently.

In the polycondensation reaction, an end sealing agent or a molecular weight controlling agent is generally used. Examples of the end sealing agent include compounds having a monovalent phenolic hydroxyl group such as ordinary phenol, p-tert-butylphenol, p-cumylphenol and tribromophenol, long-chain alkyl phenols, aliphatic carboxylic acid chlorides, aliphatic carboxylic acids, hydroxybenzoic acid alkyl esters, hydroxyphenyl alkyl acid esters and alkyl ether phenols. The amount thereof is 100 mol to 0.5 mol, preferably 50 mol to 2 mol, based on 100 mol of the total of the dihydric phenol-based compounds used. Two or more of the above compounds may be used in combination as a matter of course.

In order to facilitate the polycondensation reaction, a catalyst such as a tertiary amine exemplified by triethylamine or a quaternary ammonium salt may be added.

The reaction time of the polycondensation reaction is preferably not less than 30 minutes, more preferably not less than 50 minutes. A small amount of an antioxidant such as sodium sulfite or hydrosulfide may be added as desired.

A branching agent may be used in combination with the above dihydric phenol-based compound to obtain a branched polycarbonate-polydiorganosiloxane. Examples of the polyfunctional aromatic compound having 3 or more functional groups used for the branched polycarbonate-polydiorganosiloxane copolymer resin include phloroglucin, phloroglucide or 4,6-dimethyl-2,4,6-tris(4-hydroxydiphenyl)heptene-2, 2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol, 4-{4-[1,1-bis(4-hydroxyphenyl)ethyl]benzene}-α,α-dimethylbenzyl phenol and other trisphenols, tetra(4-hydroxyphenyl)methane, bis(2,4-dihydroxyphenyl) ketone, 1,4-bis(4,4-dihydroxytriphenylmethyl)benzene, or trimellitic acid, pyromellitic acid, benzophenonetetracarboxylic acid and acid chlorides thereof. Out of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred. The percentage of the polyfunctional compound in the branched polycarbonate-polydiorganosiloxane copolymer resin is preferably 0.001 mol % to 1 mol %, more preferably 0.005 mol % to 0.9 mol %, much more preferably 0.01 mol % to 0.8 mol %, particularly preferably 0.05 mol % to 0.4 mol % based on the whole amount of the aromatic polycarbonate-polydiorganosiloxane copolymer resin. The amount of the branched structure can be calculated by $^1$H-NMR measurement.

The reaction pressure may be reduced pressure, normal pressure or increased pressure, but preferably the reaction may be normally carried out at normal pressure or the pressure of reaction system itself. The reaction temperature is selected from a range of −20° C. to 50° C., and water cooling or ice cooling is desirably carried out as heat is generated by polymerization in most cases. Since the reaction time differs according to other conditions such as the reaction temperature, it cannot be specified unconditionally, but generally 0.5 to 10 hours.

Optionally, a polycarbonate-polydiorganosiloxane copolymer resin having a desired reduced viscosity [$\eta_{sp}$/C] may be acquired by carrying out a suitable physical treatment (mixing, fractionating) and/or chemical treatment (polymer reaction, crosslinking, partial decomposition) on the obtained polycarbonate-polydiorganosiloxane copolymer resin.

The obtained reaction product (crude product) may be subjected to various post-treatments such as well-known separation and purification methods, in order to collect a polycarbonate-polydiorganosiloxane copolymer resin having a desired purity (degree of purification).

The average size of polydiorganosiloxane domains in a molded article of the polycarbonate-polydiorganosiloxane copolymer resin is preferably 1 nm to 60 nm. The average size is more preferably 3 nm to 55 nm, much more preferably 5 nm to 50 nm. At or above the lower limit of the preferred range, impact resistance and flame retardancy may fully develop, and at or below the upper limit of the preferred range, impact resistance may develop stably.

Thereby, a flame-retardant polycarbonate resin composition which is excellent in impact resistance and appearance is provided.

(Component B: Polyester Resin)

The polyester resin (component B) of the present disclosure is preferably a polymer or a copolymer obtained by a condensation reaction which is carried out with an aromatic dicarboxylic acid or a reactive derivative thereof and a diol or an ester derivative thereof as main components.

Examples of preferable aromatic dicarboxylic acids here include terephthalic acid, isophthalic acid, orthophthalic acid, 1,5-naphthalenedicarboxylic acid, 2,6-naphthalenedicarboxylic acid, 4,4'-biphenyldicarboxylic acid, 4,4'-biphenyl ether dicarboxylic acid, 4,4'-biphenyl methane dicarboxylic acid, 4,4'-biphenyl sulfone dicarboxylic acid, 4,4'-biphenyl isopropylidene dicarboxylic acid, 1,2-bis (phenoxy)ethane-4,4'-dicarboxylic acid, 2,5-anthracenedicarboxylic acid, 2,6-anthracenedicarboxylic acid, 4,4'-p-terphenylenedicarboxylic acid, and 2,5-pyridinedicarboxylic acid and other aromatic-based dicarboxylic acids. In particular, terephthalic acid or 2,6-naphthalenedicarboxylic acid are preferably used.

Two or more aromatic dicarboxylic acids may be used as a mixture. It is also possible to mix small amounts of one or more selected from aliphatic dicarboxylic acids such as adipic acid, azelaic acid, sebacic acid and dodecane diacid, and alicyclic dicarboxylic acids such as cyclohexane dicarboxylic acid, to the above-mentioned dicarboxylic acid.

Examples of diols which is a component of the polyester resin of the present disclosure include aliphatic diols such as ethylene glycol, propylene glycol, butylene glycol, hexylene glycol, neopentyl glycol, pentamethylene glycol, hexamethylene glycol, decamethylene glycol, 2-methyl-1,3-propanediol, diethylene glycol, and triethylene glycol, alicyclic diols such as 1,4-cyclohexanedimethanol, and diols having aromatic ring such as 2,2-bis (β-hydroxyethoxyphenyl) propane, and mixtures thereof. Further, one or more of long-chain diols having a molecular weight of 400 to 6,000, for example, polyethylene glycol, poly-1,3-propylene glycol, or polytetramethylene glycol, may be copolymerized therewith in small amount.

The polyester resin of the present disclosure can be branched by introducing a small amount of branching agent. The type of the branching agent is not limited, and examples thereof include trimesic acid, trimellitic acid, trimethylolethane, trimethylolpropane, and pentaerythritol.

Examples of the specific polyester resin include polyethylene terephthalate (PET), polypropylene terephthalate, polybutylene terephthalate (PBT), polyhexylene terephthalate, polyethylene naphthalate (PEN), polybutylene naphthalate (PBN), and polyethylene-1,2-bis (phenoxy)ethane-4,4'-dicarboxylate. Additional examples include copolyester resins such as polyethylene isophthalate/terephthalate and polybutylene terephthalate/isophthalate. Among these, polyethylene terephthalate, polybutylene terephthalate, polyethylene naphthalate, polybutylene naphthalate, and mixtures thereof, which have well-balanced mechanical properties or the like, can preferably be used. In particular, a mixed use of polyethylene terephthalate and polybutylene terephthalate is preferred in terms of impact strength and chemical resistance. Regarding the use (weight) ratio of polyethylene terephthalate and polybutylene terephthalate, polyethylene terephthalate/polybutylene terephthalate is preferably in the range of 40/60 to 95/5, particularly preferably in the range of 50/50 to 90/10.

Further, the structure of the terminal group of the obtained polyester resin is not particularly limited. The ratios of terminal hydroxyl groups and the terminal carboxyl groups may be almost the same, or, either the terminal hydroxyl groups or the terminal carboxyl groups may have larger percentage than the other. Furthermore, the terminal group may be sealed for example by a reaction with a compound reactive with these terminal group.

Production of such a polyester resin is performed according to a conventional method in the presence of a polycondensation catalyst containing titanium, germanium, antimony, or the like, by polymerizing the dicarboxylic acid component and the diol component while being heated, and discharging by-produced water or a lower alcohol out of the system. For example, the germanium-based polymerization catalyst includes an oxide, a hydroxide, a halide, an alcoholate, and a phenolate of germanium. More specifically, the germanium-based polymerization catalyst includes germanium oxide, germanium hydroxide, germanium tetrachloride, tetramethoxygermanium. In addition, in the present disclosure, a compound such as manganese, zinc, calcium, magnesium, or the like, which is used during a transesterification reaction that is a pre-stage of a conventionally known polycondensation, can be used in combination. In addition, after completion of the transesterification reaction, it is also possible to deactivate such a catalyst by a phosphoric acid compound, a phosphorous acid compound or the like, in order to conduct the polycondensation.

As for the molecular weight of the polyester resin, the intrinsic viscosity measured at 25° C. using o-chlorophenol as a solvent is preferably from 0.4 to 1.2, more preferably from 0.65 to 1.15.

The content of the component B is 60 to 0 parts by weight, preferably 60 to 5 parts by weight, more preferably 50 to 10 parts by weight, and even more preferably 40 to 20 parts by weight, based on 100 parts by weight of the total of the component A and the component B. When the content of the component B is 60 parts by weight or less, satisfactory impact resistance and flame retardancy are provided.

In an embodiment according to the flame-retardant polycarbonate resin composition of the present disclosure, the resin component consists of:
(A) 40 to 95 parts by weight of a polycarbonate resin (component A) and
(B) 60 to 5 parts by weight of a polyester resin (component B).

According to an embodiment of the present disclosure, it is considered that the resin composition exhibits excellent chemical resistance in addition to excellent mechanical properties, flame retardancy, and appearance of molded articles, by comprising a polyester-based resin in addition to a polycarbonate resin, a specific impact modifier, a phosphazene having 98.5 mol % or more of phosphazene cyclic trimer and a dripping inhibitor. When the content of the component B is 5 parts by weight or more, sufficient chemical resistance may be provided.

<Component CI: A Polymer Obtained by Polymerizing at Least One Selected from a Group Consisting of Aromatic Vinyl Monomer, Vinyl Cyanide Monomer, and Alkyl(Meth) Acrylate Monomer>

The component CI of the present invention is a polymer obtained by polymerizing at least one monomer selected from a group consisting of aromatic vinyl monomer, vinyl cyanide monomer, and alkyl(meth)acrylate monomer. Examples of the aromatic vinyl monomer include styrene, α-methylstyrene, o-methylstyrene, p-methylstyrene, vinylxylene, ethylstyrene, dimethylstyrene, p-tert-butylstyrene, vinylnaphthalene, and methoxystyrene, and styrene is preferable. These may be used alone or in combination of two or more thereof. Examples of the vinyl cyanide monomer include acrylonitrile and methacrylonitrile, and acrylonitrile is particularly preferable. These may be used alone or in combination of two or more thereof. Specific examples of the alkyl(meth)acrylate monomer include methyl (meth) acrylate, ethyl (meth) acrylate, propyl (meth) acrylate, isopropyl (meth) acrylate, butyl (meth) acrylate, amyl (meth) acrylate, hexyl (meth) acrylate, octyl (meth) acrylate, 2-ethylhexyl (meth) acrylate, cyclohexyl (meth) acrylate, dodecyl (meth) acrylate, octadecyl (meth) acrylate, phenyl (meth) acrylate, and benzyl (meth) acrylate. Note that the notation of (meth)acrylate indicates that it includes both methacrylate and acrylate.

Specific examples of the polymer include polystyrene resin (PS resin), acrylonitrile-styrene copolymer (AS resin), acrylonitrile-α-methylstyrene copolymer (αMS-AN copolymer), methyl (meth) acrylate-styrene copolymer (MS copolymer), and methyl (meth) acrylate-styrene-acrylonitrile copolymer (MAS copolymer), and acrylonitrile-styrene copolymer (AS resin) is particularly preferable. Although there is no particular limitation on the composition ratio of the AS resins, the ratio of styrene/acrylonitrile is preferably 95/5 to 50/50, more preferably 90/10 to 60/40.

The polymer may be produced by bulk polymerization, solution polymerization, suspension polymerization, or emulsion polymerization. When the component CI is a graft polymer, the copolymerization method may be single-step graft or multi-step graft. Moreover, it may be a mixture with a copolymer comprising only a graft component by-produced at the time of manufacture.

The content of the component CI is 0 to 30 parts by weight, preferably 1 to 30 parts by weight, more preferably 5 to 20 parts by weight, even more preferably 10 to 15 parts by weight, based on 100 parts by weight of the component A. When the content of the component CI is 30 parts by weight or less, satisfactory impact resistance, flame retardancy and appearance of molded articles are provided.

In one of the embodiments of the flame-retardant polycarbonate resin composition of the present disclosure, the resin composition comprises 1 to 30 parts by weight of the component CI, based on 100 parts by weight of the resin component. When the content of the component CI is 1 parts by weight or more, sufficient fluidity may be provided.

It is considered that the resin composition of the present disclosure exhibits excellent fluidity in addition to excellent mechanical properties, flame retardancy and appearance of molded articles, by comprising a polymer obtained by polymerizing at least one selected from a group consisting of aromatic vinyl monomer, vinyl cyanide monomer, and alkyl (meth)acrylate monomer, in addition to a polycarbonate resin, a specific impact modifier, a phosphazene having 98.5 mol % or more of phosphazene cyclic trimer, and a dripping inhibitor.

<Component CII: Impact Modifier Other than the Component CI>

The flame-retardant polycarbonate resin composition of the present disclosure contains, as the component CI, an impact modifier other than the component CI (component CII). The impact modifier other than the component CI is preferably a graft polymer obtained by graft polymerization of at least one compound containing a (meth) acrylic ester compound to a rubber selected from the group consisting of a butadiene-based rubber, an acrylic rubber and a silicone-acrylate composite rubber, and more preferably a graft polymer having a core-shell structure. The core-shell type graft polymer is a graft copolymer obtained by copolymerizing a rubber component having a glass transition temperature of 10° C. or less as a core, and one or two or more kinds of monomers selected from vinyl compounds copolymerizable therewith, including a (meth) acrylic ester compound and an aromatic alkenyl compound, as a shell.

The rubber component of the component CII includes butadiene-based rubber, butadiene-acrylate composite rubber, acrylic rubber, silicone-acrylate composite rubber, isobutylene-silicone composite rubber, isoprene rubber, styrene-butadiene rubber, chloroprene rubber, ethylene-propylene rubber, nitrile rubber, ethylene-acrylic rubber, silicone rubber, epichlorohydrin rubber, fluorine rubber, and those in which hydrogen is added to unsaturated bonding portions thereof. However, from the viewpoint of a risk of generating a harmful substance during combustion, a rubber component free of halogen atom is preferred in terms of environmental load. In addition, the glass transition temperature of the rubber component is preferably −10° C. or less, more preferably −30° C. or less. Therefore, a butadiene-based rubber and an acrylic-based silicone-acrylate composite rubber are particularly preferred as the rubber component. Composite rubber refers to a rubber obtained by copolymerizing two kinds of rubber components or a rubber in which two kinds of rubber components are polymerized so as to adopt an IPN structure in which they are inseparably intertwined with each other. In the core-shell type graft polymer, the particle diameter of the core is preferably 240 nm to 300 nm, more preferably 250 nm to 290 nm, and still more preferably 260 nm to 280 nm, in weight average particle diameter. When the range is 240 nm to 300 nm, better impact resistance is achieved. The particle size distribution is desirably of the double-dispersion type having two peaks, and the double-dispersion type having two peaks in the vicinity of 100 nm and 300 nm is particularly preferable, which achieve better impact resistance compared to monodispersion type having single peak.

Examples of the aromatic vinyl in the vinyl compound to be copolymerized as the shell of the core-shell type graft polymer to the rubber component include styrene, α-methylstyrene, p-methylstyrene, alkoxystyrene and halogenated styrene. Examples of the acrylic acid ester include methyl acrylate, ethyl acrylate, butyl acrylate, cyclohexyl acrylate and octyl acrylate. Examples of the methacrylic acid ester include methyl methacrylate, ethyl methacrylate, butyl methacrylate, cyclohexyl methacrylate and octyl methacrylate, and methyl methacrylate is particularly preferred. Out of these, the core-shell type graft polymer preferably comprises a methacrylic acid ester such as methyl methacrylate as an essential component, and, more preferably, aromatic vinyl components are not included from a view point of mechanical properties and flame retardancy. This is because, since a larger amount of rubber component is present in the aromatic polycarbonate resin due to high affinity of the core-shell type graft polymer to the aromatic polycarbonate resin, the high impact resistance of the aromatic polycarbonate resin is developed more effectively, and, as a result of that, better impact resistance of the resin composition is provided. Stated more specifically, the methacrylic acid ester is contained preferably in an amount of not less than 10 wt %, more preferably in an amount of not less than 15 wt %, based on 100 wt % of the graft component (based on 100 wt % of the shell, in the case of a core-shell type polymer). An elastic polymer containing a rubber component having a glass transition temperature of 10° C. or less may be produced by bulk polymerization, solution polymerization, suspension polymerization or emulsion polymerization, and the copolymerization system may be single-step graft or multi-step graft. Further, it may be a mixture with a copolymer comprising only a graft component by-produced at the time of manufacture. Further, in addition to the common emulsion polymerization method, a soap-free polymerization method using an initiator such as potassium persulfate, a seed polymerization method, or a two-stage swelling polymerization method may also be used. Further, other methods include a method in which, in the suspension polymerization method, a water phase and a monomer phase are separately kept and both are supplied into a continuous disperser accurately in order to control the particle size by the revolution of the disperser, or a method in which, in the continuous production method, the particle size is controlled by supplying a monomer phase into an aqueous solution having dispersion ability through a fine orifice or porous filter having an opening size of several to several tens of μm. In the case of the core-shell type graft polymer, the reaction may be carried out in a single step or multiple steps for both of the core and the shell.

Such polymers are commercially available and readily available. For example, the rubber component containing butadiene rubber as a main component includes METABLEN E series manufactured by Mitsubishi Chemical Co. (e.g., E-875A in which a shell component is mainly composed of methyl methacrylate, E-870A in which a shell component is mainly composed of methyl methacrylate styrene, and the like). Examples of the rubber component containing acrylic rubber as a main component include W-series manufactured by Mitsubishi Chemical Co. (e.g., W-600A in which a shell component is mainly composed of methyl methacrylate, and the like). An example of the rubber component containing silicone-acrylate composite rubber as a main component includes METABLEN S series manufactured by Mitsubishi Chemical Co. (e.g., S-2001, S-2030 in which a shell component is mainly composed of methyl methacrylate, and the like).

The content of the component CII is 1 to 10 parts by weight, preferably 1.5 to 9 parts by weight, and more preferably 2 to 8 parts by weight, based on 100 parts by weight of the resin component. When the content of the component CII is 1 parts by weight or more, sufficient mechanical properties are provided. When the content is 10 parts by weight or less, satisfactory flame retardancy and appearance of molded articles are provided.

<Component D: Phosphazene>

The flame-retardant polycarbonate resin composition of the present disclosure contains phosphazene having 98.5 mol % or more of phosphazene cyclic trimer as the component D. Since the phosphazene has phosphorus atom(s) and nitrogen atom(s) in the molecule, the flame-retardant polycarbonate resin composition comprising the phosphazene can have an effect of suppressing a decrease in flame retardancy and a decrease in impact strength. When a compound other than the phosphazene, such as phosphoric ester or condensed phosphoric ester, is used as the phosphorus-based flame-retardant, a decrease in impact strength due to plasticization of the polycarbonate resin and a decrease in flame retardancy occur. The phosphazene is not particularly limited as long as it does not contain a halogen atom and has a phosphazene structure in a molecule. The term "phosphazene structure" used herein refers to a structure represented by the formula —P(R2)=N— [wherein, R2 is an organic group]. The phosphazene is represented by the general formulas (6), (7).

[Chem 7]

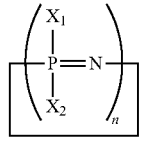
(6)

[Chem 8]

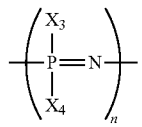
(7)

(In the above formulas, $X_1$, $X_2$, $X_3$ and $X_4$ each represents a hydrogen atom, a hydroxyl group, an amino group, or an organic group containing no halogen atoms. "n" represents an integer of 3 to 10.)

In the above formulas (6) and (7), examples of the organic group containing no halogen atoms represented by $X_1$, $X_2$, $X_3$ and $X_4$ include alkoxy group, phenyl group, amino group and allyl group.

The phosphazene as the component D needs to contain 98.5 mol % or more of phosphazene cyclic trimer. The content of the phosphazene cyclic trimer is preferably 99 mol % to 100 mol %, more preferably 99.5 mol % to 100 mol %. When the content of the phosphazene cyclic trimer is 98.5 mol % or more, a flame retardancy of 5VB is achieved in reduced thickness.

A commonly used manufacturing method for the phosphazene is found for example from EP728811A1 or WO97/40092A.

In the manufacturing process of the phosphazene, not only the cyclic trimer but also cyclic tetramer and higher oligomers are generated as by-products. However, the content of the phosphazene cyclic trimer can be increased by purification by column chromatography, etc.

Incidentally, it is possible to quantify the content of phosphazene cyclic trimers in phosphazene by $^{31}$PNMR (chemical shift; trimer δ: 6.5 ppm to 10.0 ppm, tetramer δ: −10 ppm to −13.5 ppm, higher oligomer δ: −16.5 ppm to −25.0 ppm).

The content of the component D is 1 to 20 parts by weight, preferably 5 to 15 parts by weight, and more preferably 8 to 12 parts by weight, based on 100 parts by weight of the resin component. When the content of the component D is 1 parts by weight or more, flame retardant effect is obtained. When the amount is 20 parts by weight or less, satisfactory impact resistance is provided.

<Component E: Dripping Inhibitor>

The flame-retardant polycarbonate resin composition of the present disclosure comprises a dripping inhibitor as the component E. When the dripping inhibitor is used, satisfactory flame retardancy can be achieved without impairing the physical properties of the molded article.

The dripping inhibitor as the component E includes a fluorine-containing polymer having fibril-forming ability, and examples thereof include polytetrafluoroethylene, tetrafluoroethylene-based copolymers (such as tetrafluoroethylene/hexafluoropropylene copolymer), partially fluorinated polymers described for example in the US patent publication U.S. Pat. No. 4,379,910A and polycarbonate resins produced from fluorinated diphenols. Among these, polytetrafluoroethylene (may be referred to as "PTFE" hereinafter) is particularly preferred.

PTFE having fibril-forming ability has an extremely high molecular weight and tends to become fibrous through the bonding of PTFE's by an external function such as shearing force. The number average molecular weight obtained from standard specific gravity of PTFE is preferably 1,000,000 to 10,000,000, more preferably 2,000,000 to 9,000,000. PTFE in the form of a solid or PTFE in the form of an aqueous dispersion may be used. PTFE having fibril-forming ability may be used as a mixture with another resin in order to improve dispersibility in a resin and to obtain further improved flame retardancy and mechanical properties.

Commercially available products of PTFE having fibril-forming ability include Teflon (registered trademark) 6J of Du Pont-Mitsui Fluorochemicals Co., Ltd, and Polyflon MPA FA500 and F-201L of Daikin Industries Ltd. Commercially available products of the aqueous dispersion of PTFE include Fluon AD-1 and AD-936 of Asahi ICI Fluoropolymers Co., Ltd., Fluon D-1 and D-2 of Daikin Industries, Ltd, and Teflon (registered trademark) 30J of Du Pont-Mitsui Fluorochemicals Co., Ltd.

PTFE in a mixture form may be obtained by (1) a method in which an aqueous dispersion of PTFE and an aqueous dispersion or solution of an organic polymer are mixed together to carry out co-precipitation so as to obtain a coaggregation mixture (method disclosed in JP-A S60-258263 and JP-A S63-154744), (2) a method in which an aqueous dispersion of PTFE and dried organic polymer particles are mixed together (method disclosed in JP-A H4-272957), (3) a method in which an aqueous dispersion of PTFE and an organic polymer particle solution are uniformly mixed together and their media are removed from the mixture at the same time (method disclosed in JP-A H06-220210 and JP-A H08-188653, etc.), (4) a method in which a monomer forming an organic polymer is polymerized in an aqueous dispersion of PTFE (method disclosed in JP-A H9-95583), or (5) a method in which an aqueous dispersion of PTFE and a dispersion of an organic polymer are uniformly mixed together and then a vinyl-based monomer is polymerized in the mixed dispersion to obtain a mixture (method disclosed in JP-A H11-29679). Commercially available products of PTFE in these mixture forms include "METABLEN A3800" (trade name) of Mitsubishi Rayon Co., Ltd., and "BLENDEX B449" (trade name) of GE Specialty Chemicals.

As for the percentage of PTFE in the mixture form, the content of PTFE is preferably 1 wt % to 60 wt %, more preferably 5 wt % to 55 wt % based on 100 wt % of the PTFE mixture. When the percentage of PTFE falls within the above range, the high dispersibility of PTFE can be obtained. Incidentally, the content of the component E represents the net amount of the dripping inhibitor, or it represents the net amount of PTFE in the case of PTFE in the mixture form.

The content of the component E is preferably 0.05 to 2 parts by weight, more preferably 0.1 to 1.5 parts by weight, much more preferably 0.2 to 1 parts by weight based on 100 parts by weight of the resin component. When the content of the dripping inhibitor falls within the above range, satisfactory flame retardancy is provided, the deterioration of appearance due to the precipitation of PTFE on the surface of molded articles is prevented, and the cost of the resin composition is reduced.

The styrene-based monomer used in the organic polymer used for the polytetrafluoroethylene-based mixture of the present disclosure includes for example a styrene which may be substituted by at least one group selected from the group consisting of alkyl group having 1 to 6 carbon atoms, alkoxy group having 1 to 6 carbon atoms and halogen. Examples thereof include ortho-methylstyrene, meta-methylstyrene, para-methylstyrene, dimethylstyrene, ethyl-styrene, para-tert-butylstyrene, methoxystyrene, fluorostyrene, monobromostyrene, dibromostyrene, tribromostyrene, vinyl xylene and vinyl naphthalene, but the styrene-based monomer is not limited to those exemplified. The styrene-based monomers may be used alone or in combination of two or more thereof.

The acrylic monomer for the organic-based polymer used in the polytetrafluoroethylene-based mixture of the present disclosure includes a (meth)acrylate derivative which may be substituted. More specifically, the acrylic monomer includes a (meth)acrylate derivative which may be substituted by at least one group selected from the group consisting of alkyl group having 1 to 20 carbon atoms, cycloalkyl group having 3 to 8 carbon atoms, aryl group and glycidyl group. Examples thereof include (meth)acrylonitrile, methyl (meth)acrylate, ethyl (meth) acrylate, propyl (meth) acrylate, butyl (meth)acrylate, amyl (meth)acrylate, hexyl (meth) acrylate, 2-ethylhexyl (meth) acrylate, cyclohexyl(meth) acrylate, octyl (meth)acrylate, dodecyl (meth)acrylate, phenyl (meth) acrylate, benzyl (meth) acrylate and glycidyl (meth) acrylate, and a maleimide which may be substituted by an alkyl group having 1 to 6 carbon atoms or aryl group, such as maleimide, N-methyl-maleimide and N-phenyl-maleimide, maleic acid, phthalic acid and itaconic acid. However, the acrylic monomer is not limited to those exemplified. The acrylic monomers may be used alone or in combination of two or more thereof. Out of these, (meth) acrylonitrile is preferred.

The amount of the acrylic-monomer-derived unit contained in the organic polymer used in a coating layer is preferably 8 to 11 parts by weight, more preferably 8 to 10 parts by weight, much more preferably 8 to 9 parts by weight based on 100 parts by weight of the styrene-based-monomer-derived unit. When the amount of the acrylic-monomer-derived unit is 8 parts by weight or more, satisfactory coating strength may be provided, and when the amount is 11 parts by weight or less, satisfactory surface appearance of molded articles may be provided.

The polytetrafluoroethylene-based mixture of the present disclosure has a residual water content of preferably 0.5 wt % or less, more preferably 0.2 wt % to 0.4 wt %, much more preferably 0.1 wt % to 0.3 wt %. When the residual water content is 0.5 wt % or less, satisfactory flame retardancy may be provided.

The production process of the polytetrafluoroethylene-based mixture of the present disclosure includes a step of forming a coating layer containing at least one monomer selected from the group consisting of a styrene-based monomer and an acrylic monomer in the presence of an initiator on the exterior of a branched polytetrafluoroethylene. Preferably, the production process further includes a drying step for reducing the residual water content to 0.5 wt % or less, preferably 0.2 wt % to 0.4 wt %, more preferably 0.1 wt % to 0.3 wt %, after the step of forming the coating layer. The drying step may be carried out for example by using a method known in the industry, such as hot-air drying method or vacuum drying method.

The initiator used for the polytetrafluoroethylene-based mixture of the present disclosure is not particularly limited, provided that it is an initiator used for the polymerization reaction of a styrene-based monomer and/or acrylic monomer. Examples of the initiator include cumyl hydroperoxide, di-tert-butyl peroxide, benzoyl peroxide, hydrogen peroxide and potassium peroxide, but is not limited thereto. Depending on the reaction condition, at least one initiator may be used for the polytetrafluoroethylene-based mixture of the present disclosure. The amount of the initiator is freely selected in consideration of the amount of polytetrafluoroethylene as well as the type and amount of the monomer, and preferably 0.15 to 0.25 parts by weight based on the amount of the whole composition.

The polytetrafluoroethylene-based mixture of the present disclosure was produced by a suspension polymerization method based on the following procedure.

After water and a branched polytetrafluoroethylene dispersion (solid content: 60%, polytetrafluoroethylene particle diameter: 0.15 μm to 0.3 μm) were first fed to a reactor, an acrylic monomer, a styrene monomer and cumene hydroperoxide as a water-soluble initiator were added to the mixture under agitation to carry out a reaction at 80° C. to 90° C. for 9 hours. After the completion of the reaction, centrifugation was carried out by a centrifugal separator for 30 minutes to remove water, so as to obtain a product in the form of a paste. Thereafter, the paste product was dried with a hot-air drier at 80° C. to 100° C. for 8 hours. The dried product was then ground to obtain the polytetrafluoroethylene-based mixture of the present disclosure.

Since the above-mentioned suspension polymerization method does not require a polymerization step carried out by emulsion dispersion in the emulsion polymerization method as disclosed in Japanese Patent No. 3469391, an emulsifier and an electrolyte salt for solidifying and precipitating latex after polymerization are not required. Further, since the emulsifier and the electrolyte salt contained in the mixture tend to be coexistent in the polytetrafluoroethylene mixture produced by the emulsion polymerization method and are hard to remove, it is difficult to reduce the contents of sodium metal ion and potassium metal ion derived from the emulsifier and the electrolyte salt. Since the polytetrafluoroethylene-based mixture used in the present disclosure is produced by the suspension polymerization method, the emulsifier and the electrolyte salt are not used, which makes it possible to reduce the sodium metal ion and the potassium metal ion in the mixture, resulting in improved thermal stability and hydrolysis resistance.

In addition, coated branched PTFE may be used as the dripping inhibitor in the present disclosure. The coated branched PTFE is a polytetrafluoroethylene-based mixture consisting of branched polytetrafluoroethylene particles and an organic polymer. The coated branched PTFE has a coating layer made of an organic polymer, preferably made of a polymer containing a styrene-based-monomer-derived unit and/or an acrylic-monomer-derived unit, on the exterior of the branched polytetrafluoroethylene. The coating layer is formed on the surface of the branched polytetrafluoroethylene. Further, the coating layer preferably contains a copolymer of a styrene-based monomer and an acrylic monomer.

The polytetrafluoroethylene contained in the coated branched PTFE is a branched polytetrafluoroethylene. When the contained polytetrafluoroethylene is not a branched polytetrafluoroethylene, the effect of dripping prevention becomes insufficient in the case where the reduced amount of polytetrafluoroethylene is added. The branched polytetrafluoroethylene is a particulate with a particle diameter of preferably 0.1 μm to 0.6 μm, more preferably 0.3 μm to 0.5 μm, much more preferably 0.3 μm to 0.4 μm. When the particle diameter is smaller than 0.1 μm, a molded article has excellent surface appearance; however, a polytetrafluoroethylene having a particle diameter smaller than 0.1 μm is hardly available commercially. When the particle diameter is 0.6 μm or more, surface appearance of a molded article may be deteriorated. The number average molecular weight of the polytetrafluoroethylene used in the present disclosure is preferably $1 \times 10^4$ to $1 \times 10^7$, more preferably $2 \times 10^6$ to $9 \times 10^6$, and in general, polytetrafluoroethylene having higher molecular weight is more preferred from the viewpoint of stability. It may be in a powder or dispersion form. The content of the branched polytetrafluoroethylene in the coated branched PTFE is preferably 20 to 60 parts by weight, more preferably 40 to 55 parts by weight, much more preferably 47 to 53 parts by weight, particularly preferably 48 to 52 parts by weight, most preferably 49 to 51 parts by weight based on 100 parts by weight of the total weight of the coated branched PTFE. When the percentage of the branched polytetrafluoroethylene falls within the above range, the high dispersibility of the branched polytetrafluoroethylene can be achieved.

<Component F: Silicate Mineral>

The flame-retardant polycarbonate resin composition of the present disclosure may contain a silicate mineral as the component F. Such silicate minerals are minerals consisting of at least a metal oxide component and a $SiO_2$ component, and are preferably orthosilicates, disilicates, cyclic silicates, chain silicates or the like. Silicate minerals take a crystalline state, and the shape of the crystals can take various shapes such as a fibrous shape or a plate-like shape.

The silicate mineral may be composite oxide, oxyacid salt (made of an ion lattice), or solid solution. Further, the composite oxide may be a combination of two or more single oxides or a combination of two or more of single oxides and oxyacid salts. Further, the solid solution may be a solid solution of two or more metal oxides, or a solid solution of two or more oxyacid salts.

The silicate mineral may be a hydrate. The form of crystal water in the hydrate is a hydrogen silicate ion as Si—OH, a hydroxy ion (OH—) against a metal cation, or a $H_2O$ molecule in a gap in the structure.

As the silicate mineral, an artificially synthesized product corresponding to a natural product may also be used. As the artificially synthesized product, silicate minerals obtained by conventionally known various methods, for example, various synthesizing methods making use of a solid reaction, hydrothermal reaction and super high-pressure reaction may be used.

Examples of the silicate mineral in each metal oxide (MO) component are given below. The names within the parentheses are the names of minerals containing the silicate mineral as the main component, and the compounds within the parentheses may be used as exemplified metal salts.

Silicate minerals containing $K_2O$ as a component include $K_2O.SiO_2$, $K_2O.4SiO_2.H_2O$, $K_2O.Al_2O_3.2SiO_2$ (kalsilite), $K_2O.Al_2O_3.4SiO_2$ (leucite) and $K_2O.Al_2O_3.6SiO_2$ (orthoclase).

Silicate minerals containing $Na_2O$ as a component include $Na_2O.SiO_2$ and hydrate thereof, $Na_2O.2SiO_2$, $2Na_2O.SiO_2$, $Na_2O.4SiO_2$, $Na_2O.3SiO_2.3H_2O$, $Na_2O.Al_2O_3.2SiO_2$, $Na_2O.Al_2O_3.4SiO_2$ (jadeite), $2Na_2O.3CaO.5SiO_2$, $3Na_2O.2CaO.5SiO_2$ and $Na_2O.Al_2O_3.6SiO_2$ (albite).

Silicate minerals containing $Li_2O$ as a component include $Li_2O.SiO_2$, $2Li_2O.SiO_2$, $Li_2O.SiO_2.H_2O$, $3Li_2O.2SiO_2$, $Li_2O.Al_2O_3.4SiO_2$ (petalite), $Li_2O.Al_2O_3.2SiO_2$ (eucryptite) and $Li_2O.Al_2O_3.4SiO_4$ (spodumene).

Silicate minerals containing BaO as a component include $BaO.SiO_2$, $2BaO.SiO_2$, $BaO.Al_2O_3.2SiO_2$ (celsian) and $BaO.TiO_2.3SiO_2$ (bentonite).

Silicate minerals containing CaO as a component include $3CaO.SiO_2$ (alite of a cement clinker mineral), $2CaO.SiO_2$ (belite of a cement clinker mineral), $2CaO.MgO.2SiO_2$ (akermanite), $2CaO.Al_2O_3.SiO_2$ (gehlenite), solid solution of akermanite and gehlenite (melilite), $CaO.SiO_2$ (wollastonite (including both α-type and β-type)), $CaO.MgO.2SiO_2$ (diopside), $CaO.MgO.SiO_2$ (monticellite), $3CaO.MgO.2SiO_2$ (merwinite), $CaO.Al_2O_3.2SiO$ (anorthite), and tobermorite group hydrates such as $5CaO.6SiO_2.5H_2O$ (tobermorite, $5CaO.6SiO_2.9H_2O$ is also included), wollastonite group hydrates such as $2CaO.SiO_2.H_2O$ (hillebrandite), xonotlite group hydrates such as $6CaO.6SiO_2.H_2O$ (xonotlite), gyrolite group hydrates such as $2CaO.SiO_2.2H_2O$ (gyrolite), $CaO.Al_2O_3.2SiO_2.H_2O$ (lawsonite), $CaO.FeO.2SiO_2$ (hedenbergite), $3CaO.2SiO_2$ (kilchoanite), $3CaO.Al_2O_3.3SiO_2$ (grossular), $3CaO.Fe_2O_3.3SiO_2$ (andradite), $6CaO.4Al_2O_3.FeO.SiO_2$ (pleochroaite), clinozoisite, piedmontite, allanite, vesuvianite, axinite, scawtite and augite.

Further, silicate minerals containing CaO as a component include Portland cements. The type of Portland cement is not particularly limited, and ordinary, early-strength, ultrahigh-early-strength, moderate-heat, sulfate-resistant or white Portland cements may be used. Mixed cements such as blast-furnace cement, silica cement and fly ash cement may also be used as the component F.

Other silicate minerals containing CaO as a component include blast furnace slag and ferrite.

Silicate minerals containing ZnO as a component include $ZnO.SiO_2$, $2ZnO.SiO_2$ (troostite) and $4ZnO.2SiO_2.H2O$ (hemimorphite).

Silicate minerals containing MnO as a component include $MnO.SiO_2$, $2MnO.SiO_2$, $CaO.4MnO.5SiO_2$ (rhodonite) and kozulite.

Silicate minerals containing FeO as a component include $FeO.SiO_2$ (ferrosilite), $2FeO.SiO_2$ (fayalite), $3FeO.Al_2O_3.3SiO_2$ (almandine) and $2CaO.5FeO.8SiO_2.H_2O$ (ferroactinolite).

Silicate minerals containing CoO as a component include $CoO.SiO_2$ and $2CoO.SiO_2$.

Silicate minerals containing MgO as a component include $MgO.SiO_2$ (steatite, enstatite), $2MgO.SiO_2$ (forsterite), $3MgO.Al_2O_3.3SiO_2$ (pyrope), $2MgO.2Al_2O_3.5SiO_2$ (cordierite), $2MgO.3SiO_2.5H_2O$, $3MgO.4SiO_2.H_2O$ (talc), $5MgO.8SiO_2.9H_2O$ (attapulgite), $4MgO.6SiO_2.7H_2O$ (sepiolite), $3MgO.2SiO_2.2H_2O$ (chrysolite), $5MgO.2CaO.8SiO_2.H_2O$ (tremolite), $5MgO.Al_2O_3.3SiO_2.4H_2O$ (chlorite), $K_2O.6MgO.Al_2O_3.6SiO_2.2H_2O$ (phlogopite), $Na_2O.3MgO.3Al_2O_3.8SiO_2.H_2O$ (glaucophane), magnesium tourmaline, anthophyllite, cummingtonite, vermiculite and smectite.

Silicate minerals containing $Fe_2O_3$ as a component include $Fe_2O_3.SiO_2$.

Silicate minerals containing $ZrO_2$ as a component include $ZrO_2.SiO_2$ (zircon) and AZS refractory.

Silicate minerals containing $Al_2O_3$ as a component include $Al_2O_3.SiO_2$ (sillimanite, andalusite, kyanite), $2Al_2O_3.SiO_2$, $Al_2O_3.3SiO_2$, $3Al_2O_3.2SiO_2$ (mullite), $Al_2O_3.2SiO_2.2H_2O$ (kaolinite), $Al_2O_3.4SiO_2.H_2O$ (pyrophyllite), $Al_2O_3.4SiO_2.H_2O$ (bentonite), $K_2O.3Na_2O.4Al_2O_3.8SiO_2$ (nepheline), $K_2O.3Al_2O_3.6SiO_2.2H_2O$ (muscovite, sericite), $K_2O.6MgO.Al_2O_3.6SiO_2.2H_2O$ (phlogopite), zeolite, fluorophlogopite and biotite.

Out of the above silicate minerals, mica, talc and wollastonite are particularly preferred.

(Talc)

In the context of the present disclosure, talc is hydrous magnesium silicate in terms of chemical composition, generally represented by the chemical formula $4SiO_2.3MgO.2H_2O$ and generally a flaky particle having a lamellar structure. In terms of the composition, talc comprises 56 wt % to 65 wt % of $SiO_2$, 28 wt % to 35 wt % of MgO and about 5 wt % of $H_2O$. As other trace components, it comprises 0.03 wt % to 1.2 wt % of $Fe_2O_3$, 0.05 wt % to 1.5 wt % of $Al_2O_3$, 0.05 wt % to 1.2 wt % of CaO, not more than 0.2 wt % of $K_2O$ and not more than 0.2 wt % of $Na_2O$. As for the particle diameter of talc, the average particle diameter measured by a sedimentation method is preferably 0.1 μm to 15 μm (more preferably 0.2 μm to 12 μm, much more preferably 0.3 μm to 10 μm, particularly preferably 0.5 to 5 μm). Further, it is particularly preferable to use talc having a bulk density of 0.5 (g/cm$^3$) or more as a raw material. The average particle diameter of talc is D50 (median diameter in particle size distribution) measured by an X-ray transmission method which is one of liquid-phase sedimentation methods. An example of the apparatus used for this measurement includes the Sedigraph5100 manufactured by Micromeritics.

The method of milling talc ore is not particularly limited, and axial-flow milling, annular milling, roll milling, ball milling, jet milling and container-rotation-type compression-shearing milling methods may be used. Further, milled talc is preferably classified by various classifiers to become uniform in particle size distribution. The classifier is not particularly limited and may be an impactor-type inertia force classifier (such as variable impactor), Coanda-effect-use inertia force classifier (such as elbow jet), or centrifugal classifier (such as multi-stage cyclone classifier, microplex classifier, dispersion separator, accucut classifier, turbo classifier, turboplex classifier, micron separator or super separator). Further, talc in an agglomerated state is preferred from the viewpoint of handling ease, and production processes thereof include one making use of deaeration compression and one making use of compression by using a sizing agent. The process making use of deaeration compression is particularly preferred because it is simple and prevents an unrequired sizing agent resin component from being contained in the resin composition of the present disclosure.

(Mica)

Mica preferably has an average particle size of 10 μm to 100 μm as measured by a microtrack laser diffraction method. More preferably, the average particle size is 20 μm to 50 μm. When the average particle size of mica is less than 10 μm, the improvement effect on the rigidity is not sufficient. When the average particle size is more than 100 μm, improvement in rigidity is not sufficient and mechanical strength such as impact characteristics is greatly reduced, which is not preferable. The mica having a thickness of 0.01 μm to 1 μm measured by observation with an electron microscope can be preferably used. More preferably, the thickness is 0.03 μm to 0.3 μm. The aspect ratio of mica is preferably 5 to 200 and more preferably 10 to 100. The mica used is preferably muscovite mica, and Mohs hardness thereof is about 3. Muscovite mica can achieve higher rigidity and higher strength compared to other mica such as phlogopite, solving the problem of the present disclosure at a higher level. Further, a method for pulverizing mica may be either a dry pulverization method or a wet pulverization method. While the dry pulverization method is more common due to lower cost, the wet milling method is effective in milling the mica thinner and finer, resulting in an increased improvement effect on rigidity of the resin composition.

(Wollastonite)

The fiber diameter of wollastonite is preferably 0.1 μm to 10 μm more preferably 0.1 μm to 5 μm, much more preferably 0.1 μm to 3 sm. The aspect ratio (average fiber length/average fiber diameter) of wollastonite is preferably not less than 3. The upper limit of the aspect ratio may be not more than 30. As for the fiber diameter, a reinforcing filler is observed through an electron microscope to obtain a diameter of each fiber so as to calculate a number average fiber diameter from the measurement values. The reason for the use of the electron microscope is that, with an optical microscope, it is difficult to accurately measure the size range targeted here. As for the fiber diameter, in an image obtained by observing through the electron microscope, fillers to be measured for fiber diameter are chosen at random, then the fiber diameter at a position close to the center part is measured, and a number average fiber diameter is calculated from the obtained measurement values. The magnification for observation is about 1,000 times, and the number of fibers to be measured is not less than 500 (preferably not more than 600 from the viewpoint of work efficiency). As for the measurement of the average fiber length, the fillers are observed through an optical microscope to obtain the length of each fiber so as to calculate a number average fiber length from the measurement values. For the observation through the optical microscope, a sample in which fillers are dispersed so well that they do not overlap with one another is first prepared. Observation is carried out with a 20-power objective lens, and this observed image is input as image data into a CCD camera having about 250,000 pixels. The fiber length is calculated from this obtained image data by using an image analyzing apparatus and a program calculating the maximum distance between two points of the image data. Under the above conditions, the size of each pixel corresponds to a length of 1.25 μm, and the number of fibers to be measured is not less than 500 (preferably not more than 600 from the viewpoint of work efficiency).

For wollastonite used in the present disclosure, it is preferred that iron contained in the raw material ore and iron contained by the abrasion of the apparatus when the raw material ore is milled should be removed as much as possible by a magnetic ore separator in order to fully reflect the inherent whiteness of wollastonite in the resin composition. The iron content of wollastonite is preferably reduced to 0.5 wt % or less in terms of $Fe_2O_3$ by the magnetic ore separation.

It is preferable that the silicate mineral (more preferably, mica, talc, or wollastonite) is not surface-treated, but may be surface-treated with various surface treatment agents such as a silane coupling agent, a higher fatty acid ester, and a wax. Further, it may be granulated with a binding agent such as various resins, higher fatty acid esters, and waxes.

The content of the component F is preferably from 0.1 to 50 parts by weight, more preferably from 0.15 to 40 parts by weight, and still more preferably from 0.2 to 30 parts by weight, based on 100 parts by weight of the resin component. The addition of the component F results in an improvement of flame retardancy and rigidity. When the content of the component F is 50 parts by weight or less, impact resistance is secured, and poor appearance such as silver may be avoided.

(Other Additives)

(i) Phosphorus-Based Stabilizer

Examples of the phosphorus-based stabilizer include phosphite, phosphate, phosphonite, phosphonate and esters thereof, as well as tertiary phosphine.

Examples of the phosphite compound include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl) phosphite, distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, bis{2,4-bis(1-methyl-1-phenylethyl)phenyl}pentaerythritol diphosphite, phenyl bisphenol A pentaerythritol diphosphite, bis(nonylphenyl)pentaerythritol diphosphite and dicyclohexyl pentaerythritol diphosphite.

Other phosphite compounds which react with a dihydric phenol and have a cyclic structure may also be used. Examples thereof include 2,2'-methylenebis(4,6-di-tert-butylphenyl)(2,4-di-tert-butylphenyl)phosphite, 2,2'-methylenebis(4,6-di-tert-butylphenyl) (2-tert-butyl-4-methylphenyl)phosphite and 2,2'-methylenebis(4,6-di-tert-butylphenyl)octyl phosphite.

Examples of the phosphate compound include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Triphenyl phosphate and trimethyl phosphate are preferred.

Examples of the phosphonite compound include tetrakis (2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite. Tetrakis(di-tert-butylphenyl)-biphenylene diphosphonites and bis(di-tert-butylphenyl)-phenyl-phenyl phosphonites are preferred, and tetrakis(2,4-di-tert-butylphenyl)-biphenylene diphosphonites and bis(2,4-di-tert-butylphenyl)-phenyl-phenyl phosphonites are more preferred. The phosphonite compound may be used in combination with the above phosphite compound having an aryl group in which two or more of alkyl groups are substituted, which is preferable.

Examples of the phosphonate compound include dimethyl benzenephosphonate, diethyl benzenephosphonate and dipropyl benzenephosphonate.

Examples of the tertiary phosphine include triethylphosphine, tripropylphosphine, tributylphosphine, trioctylphosphine, triamylphosphine, dimethylphenylphosphine, dibutylphenylphosphine, diphenylmethylphosphine, diphenyloctylphosphine, triphenylphosphine, tri-p-tolylphosphine, trinaphthylphosphine and diphenylbenzylphosphine. Triphenylphosphine is particularly preferred as the tertiary phosphine.

The above phosphorus-based stabilizers may be used alone or in combination of two or more thereof. Out of these phosphorus-based stabilizers, phosphonite compounds or phosphite compounds represented by the following general formula (8) is preferred.

[Chem 9]

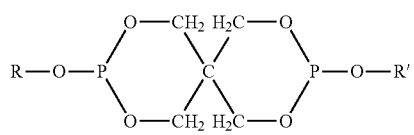

(8)

(In the formula (8), R and R' are each an alkyl group having 6 to 30 carbon atoms or aryl group having 6 to 30 carbon atoms, and may be the same or different from each other.)

As described above, tetrakis(2,4-di-tert-butylphenyl)-biphenylene diphosphonites are preferred as the phosphonite compound. Stabilizers comprising this phosphonite as the main component are marketed under the trade names of Sandostab P-EPQ (trademark, manufactured by Clariant) and Irgafos P-EPQ (trademark, manufactured by CIBA SPECIALTY CHEMICALS Inc.), and these products may be used.

More preferred phosphite compounds of the above formula (8) are distearyl pentaerythritol diphosphite, bis(2,4-di-tert-butylphenyl)pentaerythritol diphosphite, bis(2,6-di-tert-butyl-4-methylphenyl)pentaerythritol diphosphite and bis(2,4-bis(1-methyl-1-phenylethyl)phenyl)pentaerythritol diphosphite.

Distearyl pentaerythritol diphosphite is marketed under the trade names of ADK STAB PEP-8 (trademark, manufactured by ADEKA CORPORATION) and JPP681S (trademark, manufactured by Johoku Chemical Co., Ltd.), and these products may be used. Bis(2,4-di-tert-butylphenyl)pentaerythritol diphosphite is for example marketed under the trade names of ADK STAB PEP-24G (trademark, manufactured by ADEKA CORPORATION), Alkanox P-24 (trademark, manufactured by Great Lakes Chemical Corporation), Ultranox P626 (trademark, manufactured by GE Specialty Chemicals), Doverphos S-9432 (trademark, manufactured by Dover Chemical Corporation) and Irgaofos 126 and 126FF (trademarks, manufactured by CIBA SPECIALTY CHEMICALS Inc.), and these products may be used. Bis(2,6-di-tert-butyl-4-methylphenyl)pentaerythritol diphosphite is marketed under the trade name of ADK STAB PEP-36 (trademark, manufactured by ADEKA CORPORATION) and may be easily used. Bis{2,4-bis(1-methyl-1-phenylethyl)phenyl}pentaerythritol diphosphite is marketed under the trade names of ADK STAB PEP-45 (trademark, manufactured by ADEKA CORPORATION) and Doverphos S-9228 (trademark, manufactured by Dover Chemical Corporation), and these products may be used.

The above phosphorus-based stabilizes may be used alone or in combination of two or more thereof. The content of the phosphorus-based stabilizer is preferably 0.01 to 1.0 parts by weight, more preferably 0.03 to 0.8 parts by weight, much more preferably 0.05 to 0.5 parts by weight, based on 100 parts by weight of the resin component. When the content is 0.01 parts by weight or more, a suppression effect of thermal decomposition is obtained at the time of processing, and deterioration in mechanical properties may be suppressed. Deterioration in mechanical properties may also be suppressed when the content is 1.0 parts by weight or less.

(ii) Phenol-Based Stabilizer

The resin composition of the present disclosure may comprise a phenol-based stabilizer. The phenol-based stabilizer is generally a hindered phenol, semi-hindered phenol or less-hindered phenol compound. In particular, a hindered phenol compound is preferably used as it thermally stabilizes a polypropylene-based resin. Examples of the hindered phenol compound include α-tocopherol, butylhydroxytoluene, sinapyl alcohol, vitamin E, octadecyl-3-(3,5-di-tert-butyl-4-hydroxyphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl) phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidene-bis(3-methyl-6-tert-butylphenol), triethylene glycol-N-bis-3-(3-tert-butyl-4-hydroxy-5-methylphenyl) propionate, 1,6-hexanediol-bis[3-(3,5-di-tert-butyl-4-hydroxyphenyl) propionate], bis[2-tert-butyl-4-methyl-6-(3-tert-butyl-5-methyl-2-hydroxybenzyl) phenyl]terephthalate, 3,9-bis{2-[3-(3-tert-butyl-4-hydroxy-5-methylphenyl) propionyloxy]-1,1-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2-thiodiethylenebis-[3-(3,5-di-tert-butyl-4-hydroxyphenyl) propionate], 2,4-bis(n-octylthio)-6-(4-hydroxy-3,5-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl] hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl) benzene, tris(3,5-di-tert-butyl-4-hydroxyphenyl)isocyanurate, tris(3,5-di-tert-butyl-4-hydroxybenzyl)isocyanurate, 1,3,5-tris(4-tert-butyl-3-hydroxy-2,6-dimethylbenzyl) isocyanurate, 1,3,5-tris-2[3(3,5-di-tert-butyl-4-hydroxyphenyl) propionyloxy]ethyl isocyanurate, tetrakis[methylene-3-(3,5-di-tert-butyl-4-hydroxyphenyl) propionate]methane, triethyleneglycol-N-bis-3-(3-tert-butyl-4-hydroxy-5-methylphenyl) propionate, triethylene glycol-N-bis-3-(3-tert-butyl-4-hydroxy-5-methylphenyl) acetate, 3,9-bis[2-{3-(3-tert-butyl-4-hydroxy-5-methylphenyl) acetyloxy}-1,1-dimethylethyl]-2,4,8,10-tetraoxaspiro [5,5]undecane, tetrakis[methylene-3-(3-tert-butyl-4-hydroxy-5-methylphenyl)propionate]methane, 1,3,5-trimethyl-2,4,6-tris(3-tert-butyl-4-hydroxy-5-methylbenzyl)benzene and tris(3-tert-butyl-4-hydroxy-5-methylbenzyl)isocyanurate. Out of the above compounds, tetrakis[methylene-3-(3-tert-butyl-4-hydroxy-5-methylphenyl)propionate]methane and octadecyl-3-(3,5-di-tert-butyl-4-hydroxyphenyl) propionate are preferably used. Further, (3,3',3'',5,5',5''-hexa-tert-butyl-a,a',a''-(mesitylene-2,4,6-triyl)tri-p-cresol represented by the following formula (9) and 1,3,5-tris(3,5-di-tert-butyl-4-hydroxybenzyl)-1,3,5-triazine-2,4,6(1H,3H,5H)-trione represented by the following formula (10) are more preferably used for their excellent suppression effect on the deterioration of mechanical properties due to thermal decomposition during processing.

[Chem 10]

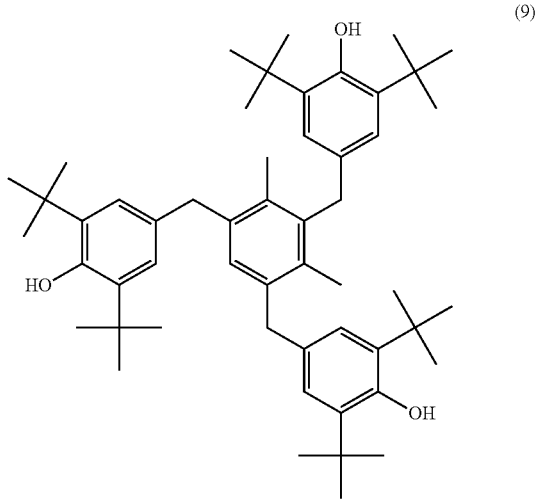

(9)

[Chem 11]

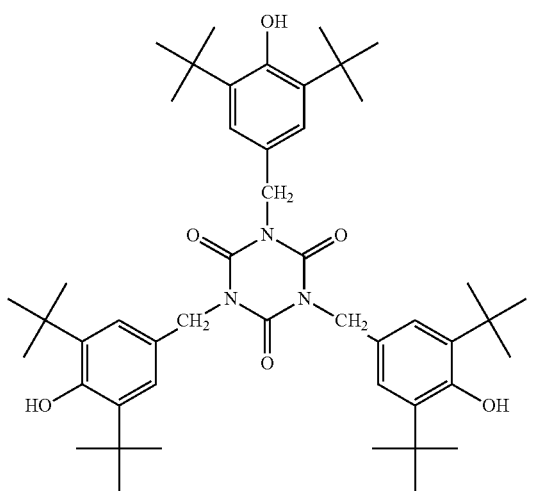

(10)

The above phenol-based stabilizers may be used alone or in combination of two or more thereof. The content of the phenol-based stabilizer is preferably 0.05 to 1.0 parts by weight, more preferably 0.07 to 0.8 parts by weight, much more preferably 0.1 to 0.5 parts by weight, based on 100 parts by weight of the resin component. When the content is 0.05 parts by weight or more, a suppression effect of thermal decomposition at the time of processing is obtained and deterioration in mechanical properties may be suppressed. Deterioration in mechanical properties may also be suppressed when the content is 1.0 parts by weight or less.

Either the phosphorus-based stabilizer or the phenol-based stabilizer is preferably used, and a combination thereof is more preferable. When they are used in combination, 0.01 to 0.5 parts by weight of the phosphorus-based stabilizer and 0.01 to 0.5 parts by weight of the phenol-based stabilizer are preferably used based on 100 parts by weight of the resin component.

(iii) Ultraviolet Absorbent

The flame-retardant polycarbonate resin composition of the present disclosure may comprise an ultraviolet absorbent. Benzophenone-based ultraviolet absorbents include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxy trihydrate benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophenone and 2-hydroxy-4-methoxy-2'-carboxybenzophenone.

Benzotriazole-based ultraviolet absorbents include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one) and 2-[2-hydroxy-3-(3,4,5,6-tetrahydrophthalimidomethyl)-5-methylphenyl] benzotriazole, and polymers having a 2-hydroxyphenyl-2H-benzotriazole skeleton, such as a copolymer of 2-(2'-hydroxy-5-methacryloxyethylphenyl)-2H-benzotriazole and a vinyl-based monomer copolymerizable with this monomer and a copolymer of 2-(2'-hydroxy-5-acryloxyethylpheny)-2H-benzotriazole and a vinyl-based monomer copolymerizable with this monomer, are also included.

Hydroxyphenyltriazine-based ultraviolet absorbents include 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol and 2-(4,6-diphenyl-1,3,5-triazin-2-yl)-5-butyloxyphenol. Further, compounds having a 2,4-dimethylphenyl group in place of the phenyl groups of the compounds exemplified above, such as 2-(4,6-bis(2,4-dimethylphenyl)-1,3,5-triazin-2-yl)-5-hexyloxyphenol, are included.

Cyclic iminoester-based ultraviolet absorbents include 2,2'-p-phenylenebis(3,1-benzoxazin-4-one), 2,2'-m-phenylenebis(3,1-benzoxazin-4-one) and 2,2'-p,p'-diphenylenebis(3,1-benzoxazin-4-one).

Cyanoacrylate-based ultraviolet absorbents include 1,3-bis[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

The above ultraviolet absorbent may have a structure of a radically polymerizable monomer compound, and such a ultraviolet absorbing monomer and/or an light stabilizing monomer may be copolymerized with a monomer such as an alkyl (meth) acrylate in order to obtain a polymer-type ultraviolet absorbent. Preferred examples of the above ultraviolet absorbing monomer include a compound having a benzotriazole skeleton, a benzophenone skeleton, a triazine skeleton, a cyclic iminoester skeleton or a cyanoacrylate skeleton in the ester substituent of a (meth)acrylic acid ester.

Out of the above compounds, a compound represented by any one of the following formulas (11), (12) and (13) is more preferably used in the present disclosure.

[Chem 12]

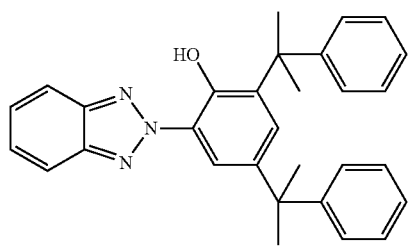

(11)

[Chem 13]

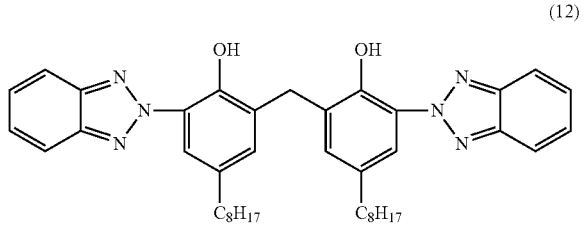

(12)

[Chem 14]

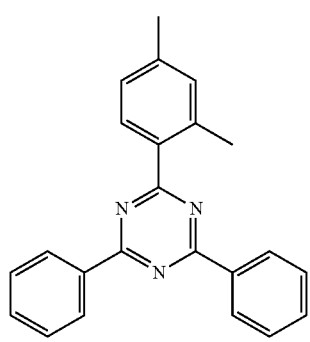

(13)

The above ultraviolet absorbents may be used alone or in combination of two or more thereof. The content of the ultraviolet absorbent is preferably 0.1 to 3 parts by weight, more preferably 0.12 to 2 parts by weight, much more preferably 0.15 to 1 parts by weight based on 100 parts by weight of the resin component. When the content of the ultraviolet absorbent is 0.1 parts by weight or more, satisfactory light resistance may develop, and when the content is 3 parts by weight or less, a poor appearance due to the generation of gas and deterioration in physical properties may be avoided, which are preferable.

(iv) Hindered Amine-Based Light Stabilizer

The flame-retardant polycarbonate resin composition of the present disclosure may comprise a hindered amine-based light stabilizer. The hindered amine-based light stabilizer is generally called HALS (Hindered Amine Light Stabilizer), and is a compound having a 2,2,6,6-tetramethylpiperidine skeleton in the structure. Examples thereof include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)carbonate, bis(2,2,6,6-tetramethyl-4-piperidyl)oxalate, bis(2,2,6,6-tetramethyl-4-piperidyl)malonate, bis(2,2,6,6-tetramethyl-4-piperidyl)sebacate, bis(2,2,6,6-tetramethyl-4-piperidyl)adipate, bis(2,2,6,6-tetramethyl-4-piperidyl)terephthalate, bis(1,2,2,6,6-pentamethyl-4-piperidyl)carbonate, bis(1,2,2,6,6-pentamethyl-4-piperidyl)oxalate, bis(1,2,2,6,6-pentamethyl-4-piperidyl)malonate, bis(1,2,2,6,6-pentamethyl-4-piperidyl)sebacate, bis(1,2,2,6,6-pentamethyl-4-piperidyl)adipate, bis(1,2,2,6,6-pentamethyl-4-piperidyl)terephthalate, N,N'-bis-2,2,6,6-tetramethyl-4-piperidinyl-1,3-benzene dicarboxyamide, 1,2-bis(2,2,6,6-tetramethyl-4-piperidyloxy)ethane, α,α'-bis(2,2,6,6-tetramethyl-4-piperidyloxy)-p-xylene, bis(2,2,6,6-tetramethyl-4-piperidyltolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, N,N',N'',N'''-tetrakis-(4,6-bis-(butyl-(N-methyl-2,2,6,6-tetramethylpiperidin-4-yl)amino)-triazin-2-yl)-4,7-diazadecane-1,10-diamine, polycondensate of dibutylamine, 1,3,5-triazine, N,N'-bis(2,2,6,6-tetramethyl-4-piperidyl)-1,6-hexamethylenediamine and N-(2,2,6,6-tetramethyl-4-piperidyl)butylamine, poly[{6-(1,1,3,3-tetramethylbutyl)amino-1,3,5-triazine-2,4-diyl} {(2,2,6,6-tetramethyl-4-piperidyl)imino} hexamethylene((2,2,6,6-tetramethyl-4-piperidyl)imino)], tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, tris(2,2,6,6-tetramethyl-4-piperidyl)-benzene-1,3,4-tricarboxylate, 1-[2-{3-(3,5-di-t-butyl-4-hydroxyphenyl)propionyloxy}butyl]-4-[3-(3,5-di-t-butyl-4-hydroxyphenyl)propionyloxy]2,2,6,6-tetramethylpiperidine and condensate of 1,2,3,4-butane tetracarboxylic acid, 1,2,2,6,6-pentamethyl-4-piperidinol and β,β,β',β'-tetramethyl-3,9-[2,4,8,10-tetraoxaspiro(5,5) undecane]diethanol.

The hindered amine-based light stabilizers are roughly divided into three types according to a bonding-pair of a nitrogen atom in a piperidine skeleton: N—H type (hydrogen is bonded to the nitrogen atom), N—R type (alkyl group (R) is bonded to the nitrogen atom) and N—OR type (alkoxy group (OR) is bonded to the nitrogen atom). When it is used for the polycarbonate resin, the N—R type and N—OR type, which have low basicity, are preferably used from the viewpoint of the basicity of the hindered amine-based light stabilizer.

Out of the above compounds, compounds represented by the following formulas (14) and (15) are preferably used in the present disclosure.

[Chem 15]

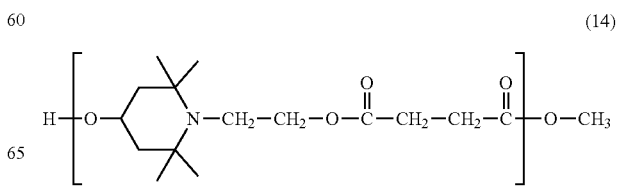

(14)

[Chem 16]

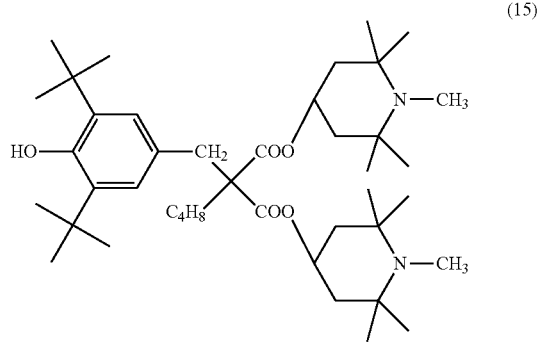

(15)

The hindered amine-based light stabilizers may be used alone or in combination of two or more thereof. The content of the hindered amine-based light stabilizer is preferably 0 to 1 parts by weight, more preferably 0.05 to 1 parts by weight, much more preferably 0.08 to 0.7 parts by weight, particularly preferably 0.1 to 0.5 parts by weight, based on 100 parts by weight of the resin component. When the content of the hindered amine-based light stabilizer is 1 parts by weight or less, poor appearance due to the generation of gas and the deterioration of physical properties due to the decomposition of the polycarbonate resin may be avoided, which are preferable. When the content is 0.05 parts by weight or more, sufficient light resistance may develop.

(v) Release Agent

Preferably, the flame-retardant polycarbonate resin composition of the present disclosure further comprises a release agent in order to improve productivity at the time of molding and to suppress the distortion of molded articles. Known release agents may be used. Examples thereof include saturated fatty acid esters, unsaturated fatty acid esters, polyolefin-based waxes (such as polyethylene wax, 1-alkene polymers; those modified by a functional group-containing compounds, such as those modified by acid, may also be used), silicone compounds, fluorine compounds (such as fluorine oils typified by polyfluoroalkyl ethers), paraffin wax and beeswax. Out of these, fatty acid esters are preferred as the release agent. The fatty acid esters are esters of an aliphatic alcohol and an aliphatic carboxylic acid. The aliphatic alcohol may be a monohydric alcohol or a polyhydric alcohol having 2 or more hydroxyl groups. The number of carbon atoms of the alcohol is 3 to 32, preferably 5 to 30. Examples of the monohydric alcohol include dodecanol, tetradecanol, hexadecanol, octadecanol, eicosanol, tetracosanol, ceryl alcohol and triacontanol. Examples of the polyhydric alcohol include pentaerythritol, dipentaerythritol, tripentaerythritol, polyglycerol (triglycerol to hexaglycerol), ditrimethylolpropane, xylitol, sorbitol and mannitol. For the fatty acid ester of the present disclosure, the polyhydric alcohol is more preferred.

On the other hand, the aliphatic carboxylic acid has preferably 3 to 32 carbon atoms, particularly preferably 10 to 22 carbon atoms. Examples of the aliphatic carboxylic acid include saturated aliphatic carboxylic acids such as decanoic acid, undecanoic acid, dodecanoic acid, tridecanoic acid, tetradecanoic acid, pentadecanoic acid, hexadecanoic acid (palmitic acid), heptadecanoic acid, octadecanoic acid (stearic acid), nonadecanoic acid, behenic acid, icosanoic acid and docosanoic acid; and unsaturated aliphatic carboxylic acids such as palmitoleic acid, oleic acid, linoleic acid, linolenic acid, eicosenoic acid, eicosapentaenoic acid and cetoleic acid. Out of these, aliphatic carboxylic acids having 14 to 20 carbon atoms are preferred, and saturated aliphatic carboxylic acids are more preferred. Stearic acid and palmitic acid are particularly preferred.

Since the above aliphatic carboxylic acids such as stearic acid and palmitic acid are generally produced from natural oils and fats such as animal oils and fats, which are typified by beef tallow and lard, and vegetable oils and fats, which are typified by palm oil and sunflower oil, they are a mixture containing other carboxylic acid components having different number of carbon atoms. Therefore, in the production of the aliphatic acid ester of the present disclosure, an aliphatic carboxylic acid, especially stearic acid or palmitic acid, which is produced from a natural oil or fat and which is therefore in the form of a mixture containing other carboxylic acid components, is preferably used.

The fatty acid ester of the present disclosure may be a partial ester or a full ester. Since the partial ester generally has a large hydroxyl value and easily triggers the decomposition of a resin at high temperature, the full ester is preferred. The acid value of the fatty acid ester of the present disclosure is preferably not more than 20, more preferably 4 to 20, much more preferably 4 to 12 from the viewpoint of heat stability. The acid value can be substantially 0. The hydroxyl value of the fatty acid ester is more preferably 0.1 to 30. Further, the iodine value is preferably not more than 10. The iodine value can be substantially 0. These properties can be determined by methods specified in JIS K 0070.

The content of the release agent is preferably 0.005 to 2 parts by weight, more preferably 0.01 to 1 parts by weight, much more preferably 0.05 to 0.5 parts by weight based on 100 parts by weight of the resin component. Within the above range, the flame-retardant polycarbonate resin composition has satisfactory mold releasability and roll releasability. In particular, this amount of fatty acid ester provides a flame-retardant polycarbonate resin composition having satisfactory mold releasability and roll releasability without compromising a satisfactory hue.

(vi) Dye or Pigment

The flame-retardant polycarbonate resin composition of the present disclosure can provide molded articles having various designs by comprising various dyes or pigments. By blending a fluorescent brightener or a fluorescent dye with luminescent properties other than the fluorescent brightener, a further improved design effect making use of emission color can be provided. A flame-retardant polycarbonate resin composition which is colored with a trace amount of a dye or a pigment and develops a bright color can be provided as well.

Examples of the fluorescent dye (including the fluorescent brightener) used in the present disclosure include coumalin-based fluorescent dyes, benzopyran-based fluorescent dyes, perylene-based fluorescent dyes, anthraquinone-based fluorescent dyes, thioindigo-based fluorescent dyes, xanthene-based fluorescent dyes, xanthone-based fluorescent dyes, thioxanthene-based fluorescent dyes, thioxanthone-based fluorescent dyes, thiazine-based fluorescent dyes and diaminostilbene-based fluorescent dyes. Out of these, coumalin-based fluorescent dyes, benzopyran-based fluorescent dyes and perylene-based fluorescent dyes are preferred because they have high heat resistance and less deteriorate at the time of molding the polycarbonate resin.

Dyes other than the above bluing agents and fluorescent dyes include perylene-based dyes, coumalin-based dyes, thioindigo-based dyes, anthraquinone-based dyes, thioxanthone-based dyes, ferrocyanides such as iron blue, perinone-based dyes, quinoline-based dyes, quinacridone-based dyes, dioxazine-based dyes, isoindolinone-based dyes and phthalocyanine-based dyes. The resin composition of the present disclosure can have better metallic color when it is blended with a metallic pigment. The metallic pigment is preferably a lamellar filler having a metal coating film or a metal oxide coating film.

The content of the above dye or pigment is preferably 0.00001 to 1 parts by weight, more preferably 0.00005 to 0.5 parts by weight based on 100 parts by weight of the resin component.

(vii) Other Heat Stabilizers

The flame-retardant polycarbonate resin composition of the present disclosure may comprise a heat stabilizer other than the above phosphorus-based stabilizer and phenol-based stabilizer. Such other heat stabilizers are preferably used in combination with any one of these stabilizers and the antioxidant, particularly preferably in combination with both of them. A preferred example of such other heat stabilizers is a lactone-based stabilizer typified by a reaction product of 3-hydroxy-5,7-di-tert-butyl-furan-2-one and o-xylene (this stabilizer is detailed in JP-H07-233160A). This compound is marketed under the trade name of Irganox HP-136 (trademark, manufactured by CIBA SPECIALTY CHEMICALS Inc.), and this product may be used. Further, a stabilizer prepared by mixing together the above compound, a phosphite compound and a hindered phenol compound is commercially available. A preferred example thereof is Irganox HP-2921 of CIBA SPECIALTY CHEMICALS Inc. This pre-mixed stabilizer may be used in the present disclosure as well. The content of the lactone-based stabilizer is preferably 0.0005 to 0.05 parts by weight, more preferably 0.001 to 0.03 parts by weight based on 100 parts by weight of the resin component.

Other stabilizers include sulfur-containing stabilizers such as pentaerythritol tetrakis(3-mercaptopropionate), pentaerythritol tetrakis(3-laurylthiopropionate) and glycerol-3-stearyl thiopropionate. These stabilizers are effective in particular when the resin composition is used for rotational molding. The content of the sulfur-containing stabilizer is preferably 0.001 to 0.1 parts by weight, more preferably 0.01 to 0.08 parts by weight based on 100 parts by weight of the resin component.

(viii) Filler

The flame-retardant polycarbonate resin composition of the present disclosure may comprise various fillers as reinforcing filler, except for the silicate mineral which is the component F, as far as it provides the effect of the present disclosure. Examples thereof include calcium carbonates, glass fibers, glass beads, glass balloons, glass milled fibers, glass flakes, carbon fibers, carbon flakes, carbon beads, carbon milled fibers, graphite, vapor deposition method hyper-fine carbon fibers (fiber diameter is less than 0.1 μm), carbon nanotube (hollow form; fiber diameter is less than 0.1 μm), fullerene, metal flakes, metal fibers, metal coated glass fibers, metal coated carbon fibers, metal coated glass flakes, silica, metal oxide particles, metal oxide fibers, metal oxide balloons, and various types of whiskers (such as potassium titanate whiskers, aluminum borate whiskers and basic magnesium sulfate). These reinforcing fillers may be used alone or in combination of at least two of them.

The content of the above filler is preferably 0.1 to 60 parts by weight, more preferably 0.5 to 50 parts by weight based on 100 parts by weight of the resin component.

(ix) Other Resins and Elastomers

Other resins and elastomers may be used in the resin composition of the present disclosure in small proportions as long as the effect of the present disclosure is obtained.

Examples of the other resins include polyamide resins, polyimide resins, polyether imide resins, polyurethane resins, silicone resins, polyphenylene ether resins, polyphenylene sulfide resin, polysulfone resin, polymethacrylate resins, phenol resins and epoxy resins.

Examples of the elastomer include isobutylene/isoprene rubber, ethylene/propylene rubber, acrylic elastomers, polyester-based elastomers and polyamide-based elastomers.

(x) Other Additives

Additives known per se may be mixed with the flame-retardant polycarbonate resin composition of the present disclosure in small proportions in order to provide various functions to molded articles and/or to improve the characteristics properties of molded articles. These additives are used in normal amounts as long as the object of the present disclosure is not impeded.

Such an additive includes a sliding agent (such as PTFE particles), a colorant (such as a pigment or a dye typified by carbon black and titanium oxide), a light diffusing agent (such as acrylic crosslinked particles, silicone crosslinked particles, ultra-thin glass flakes or calcium carbonate particles), a fluorescent dye, an inorganic phosphor (such as a phosphor containing an aluminate as a mother crystal), an antistatic agent, a crystal nucleating agent, an inorganic or organic antibacterial agent, an optical catalyst-based antifouling agent (such as particulate titanium oxide or particulate zinc oxide), a radical generator, an infrared absorbent (heat-ray absorbent); and a photochromic agent.

The present disclosure includes a molded article formed of the flame-retardant polycarbonate resin composition according to the present disclosure.

There is no particular limitation on the method for manufacturing the molded article according to the present disclosure. However, the molded article may be obtained for example by melt-kneading a mixture comprising each components constituting the polycarbonate resin composition according to the present disclosure to obtain pellets, and then drying the obtained pellets and molding them using an injection mold apparatus.

Since the flame-retardant polycarbonate resin composition of the present invention has improved mechanical properties, chemical resistance, flame retardancy and appearance of molded articles, it is useful in a wide range of fields such as OA-equipment and electronic/electric apparatus. Therefore, the industrial effect of the present invention is extremely large.

Embodiments for implementing the present disclosure is an aggregation of the preferred range of each of the above-mentioned requirements. As an example, a representative example is described in the Examples below. Needless to say, the present invention is not limited to these embodiments.

EXAMPLES

The present disclosure is further illustrated by referring to the following examples. Unless otherwise noted, parts in the examples represent parts by weight, and % represents weight % (wt %). Evaluations were carried out in accordance with the following methods.

(Evaluation of Resin Composition)

(i) Appearance of Molded Articles

A molded plate (length 90 mm×width 50 mm) having a thickness of 2 mm and an arithmetic average roughness (Ra) of 0.03 μm was molded by injection molding under the conditions of a cylinder temperature of 260° C. (Examples 1 to 25 and Comparative Examples 1 to 9) or 250° C. (Examples 26 to 50 and Comparative Examples 10 to 18), a mold temperature of 60° C., and an injection speed of 30 mm/s, and the presence or absence of silver streak was observed. The evaluation was carried out by discarding samples from immediately after the purge to the eleventh shot, and then by using the molded product of up to 20 shots for the silver streak evaluation. Incidentally, cases where the silver streak was not detected were indicated as "Good", and cases where the silver streak was detected were indicated as "Poor".

(ii) Charpy Impact Strength

Charpy impact strength of the notched was measured according to ISO 179 by using ISO-bending test pieces obtained by the method described below.

(iii) Flame Retardancy

The V test and 5V test were carried out according to UL94 using the UL test piece obtained by the method described below. When the evaluation could not satisfy any of the criteria of V-0, V-1, and V-2, it was indicated as "not V"; when the evaluation could not satisfy the criteria of 5VB, it was indicated as "not 5V".

(iv) Chemical Resistance

The ISO tensile test piece obtained by the method described below was used, and after 1% strain was applied by a three-point bending test method, a cloth impregnated with Magiclean (manufactured by Kao Corporation) was applied, and after being left at 23° C. for 48 hours, the presence or absence of a change in appearance was checked. The evaluation was carried out according to the following criteria.

Good: Those with no change in appearance

Moderate: Those with fine cracks

Poor: Those with large cracks such as rupture (v) Fluidity

The length of archimedes spiral flow with 2 mm of channel thickness and 8 mm of channel width was measured by an injection mold apparatus (SG150U, manufactured by Sumitomo Heavy industries, Ltd.). The measurement was conducted at a cylinder temperature of 260° C., a mold temperature of 70° C., and an injection pressure of 98 MPa.

Examples 1-25, Comparative Examples 1-9

With the compositions shown in Table 1 and Table 2, a mixture consisting of each component was supplied from the first feed port of the extruder. Such a mixture was obtained by mixing in a V-type blender. The extrusion was carried out using a vent-type twin screw extruder (TEX30α-38. 5BW-3V, Japan Steel Works Ltd.) having a diameter of 30 mmφ, and was melt-kneaded at a screw rotation speed of 230 rpm, a discharge rate of 25 kg/h, and a vacuum degree of the vent of 3 kPa to obtain pellets. The extrusion temperature was 260° C. from the first feed port to the die portion. A part of the obtained pellets was dried in a hot air circulation dryer at 90° C. to 100° C. for 6 hours, and then ISO-bending test pieces (compliant with ISO179), ISO-tensile test pieces (compliant with ISO527-1 and ISO527-2) and UL test pieces were molded at a cylinder temperature of 250° C., and a mold temperature of 50° C. using an injection mold apparatus.

Examples 26 to 50, Comparative Examples 10 to 18

With the compositions shown in Table 3 and 4, a mixture was supplied from the first feed port of the extruder. Such a mixture was obtained by mixing the following pre-mixture (i) and other components in a V-type blender: (i) a mixture of a dripping inhibitor of the component E and an aromatic polycarbonate of the component A, wherein the mixture was uniformly mixed in a polyethylene bag by shaking the entire bag so that the component E is 2.5% by weight of the mixture. The feeding amount of the mixture was precisely measured with a measuring instrument (CWF, manufactured by Kubota Corporation). The extrusion was carried out using a vent-type twin screw extruder (TEX30α-38. 5BW-3V, Japan Steel Works Ltd.) having a diameter of 30 mmφ, and was melt-kneaded at a screw rotation speed of 230 rpm, a discharge rate of 25 kg/h, and a vacuum degree of the vent of 3 kPa to obtain pellets. The extrusion temperature was 260° C. from the first feed port to the die portion. A part of the obtained pellets was dried in a hot air circulation dryer at 90° C. to 100° C. for 6 hours, and then ISO-bending test pieces (ISO179) and UL test pieces were molded at a cylinder temperature of 250° C., and a mold temperature of 70° C. using an injection mold apparatus.

The components represented by the symbols in Tables 1 to 4 are as follows.

(Component A)

A-1: Aromatic polycarbonate resin (polycarbonate resin powder having a viscosity mean molecular weight of 20,900 produced by a conventional method from bisphenol A and phosgene, Panlite L-1225WS (product name), manufactured by Teijin Limited)

A-2: Aromatic polycarbonate resin (polycarbonate resin powder having a viscosity mean molecular weight of 22,400 produced by a conventional method from bisphenol A and phosgene, Panlite L-1225WP (product name), manufactured by Teijin Limited)

A-3: Aromatic polycarbonate resin (polycarbonate resin powder having a viscosity mean molecular weight of 23,900 produced by a conventional method from bisphenol A and phosgene, Panlite L-1250WP (product name), manufactured by Teijin Limited)

(Component B)

B-1: Polyethylene terephthalate resin (intrinsic viscosity: 0.77dL/g, TRN-8550FF (product name), manufactured by Teijin Limited)

B-2: Polyethylene terephthalate resin (intrinsic viscosity: 0.53dL/g, TRN-MTJ (product name), manufactured by Teijin Limited)

(Component CI)
CI-1: AS resin (LITAC-A BS218 (product name), manufactured by Nippon A&L inc.; weight average molecular weight in standard polystyrene measured by GPC: 78,000)
CI-2: AS resin (LITAC-A BS207 (product name), manufactured by Nippon A&L inc.; weight average molecular weight in standard polystyrene measured by GPC: 98,000)
(Component CII)
CII-1: Silicone-based core-shell type graft polymer (graft copolymer having a core-shell structure composed of 70 wt % core with a silicone-acrylate composite rubber as a main component and 30 wt % shell with methyl methacrylate as a main component, METABLEN S-2001 (product name), manufactured by Mitsubishi Chemical Co., Ltd.)
CII-2: Butadiene-based core-shell type graft polymer (graft copolymer having a core-shell structure composed of 70 wt % core with butadiene rubber as a main component and 30 wt % shell with methyl methacrylate and styrene as main components, Kane Ace M-701 (product name), manufactured by Kaneka Corporation)
CII-3: Butadiene-based core-shell type graft polymer (graft copolymer having a core-shell structure composed of 60 wt % core with butadiene rubber as a main component and 40 wt % shell with methyl methacrylate as a main component, Kane Ace M-711 (product name), manufactured by Kaneka Corporation)
CII-4: Acrylic core-shell type graft polymer (graft copolymer having a core-shell structure composed of 60 wt % core with butadiene-acrylic composite rubber and butyl acrylate as main components and 40 wt % shell with methyl methacrylate as a main component; METABLEN W-600A (product name), manufactured by Mitsubishi Chemical Co., Ltd.)
(Component D)
D-1: Cyclic phenoxyphosphazene comprising 100 mol % of cyclic trimer corresponding to k=1 in the formula (16)
D-2: Cyclic phenoxyphosphazene comprising 98.5 mol % of cyclic trimer corresponding to k=1 in the formula (16), 1 mol % of cyclic tetramer corresponding to k=2 in the formula (16), and 0.5 mol % of cyclic multimer corresponding to k=3 or more in the formula (16)
D-3: Cyclic phenoxyphosphazene comprising 98 mol % of cyclic trimer corresponding to k=1 in the formula (16), 1.5 mol % of cyclic tetramer corresponding to k=2 in the formula (16), and 0.5 mol % of cyclic multimer corresponding to k=3 or more in the formula (16)
D-4: Cyclic phenoxyphosphazene comprising 70 mol % of cyclic trimer corresponding to k=1 in the formula (16), 20 mol % of cyclic tetramer corresponding to k=2 in the formula (16), and 10 mol % of cyclic multimer corresponding to k=3 or more in the formula (16)

[Chem 17]

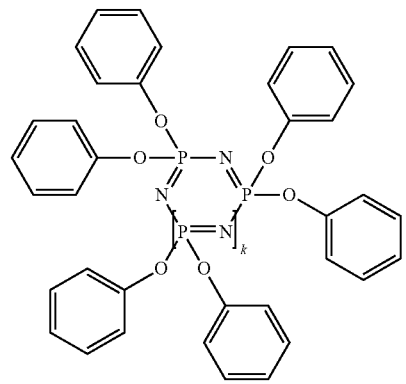

(16)

(In the formula, "k" is an integer of 1 to 10)
(Component E)
E-1: PTFE (Polyflon MPA FA500H (trade name), manufactured by Daikin Industries. Ltd.)
E-2: Coated PTFE (polytetrafluoroethylene coated with a styrene-acrylonitrile copolymer (polytetrafluoroethylene content: 50% by weight), SN3307 (trade name), manufactured by Shine polymer Co., Ltd.)
E-3: Coated PTFE (polytetrafluoroethylene coated with a copolymer of methyl methacrylate, butyl acrylate (polytetrafluoroethylene content: 50 wt %), METABLEN A3750 (trade name), manufactured by Mitsubishi Chemical Co., Ltd.)
E-4: Coated branched PTFE (branched polytetrafluoroethylene coated with a styrene-acrylonitrile copolymer (polytetrafluoroethylene content: 50 wt %), SN3300B7 (trade name), manufactured by Shine polymer Co., Ltd.)
(Component F)
F: Talc (HST0. 8 (trade name), mean particle size of 3.5 μm, manufactured by Hayashi Kasei Co., Ltd.)
(Other Components)
STB-1: phenol-based heat stabilizer (octadecyl-3-(3,5-di-tert-butyl-4-hydroxyphenyl)propionate, molecular weight: 531, Irganox 1076 (product name), manufactured by BASF Japan)
STB-2: Phosphorus-based heat stabilizer (tris(2,4-di-tert-butylphenyl)phosphite, Irgafos 168 (trade name), manufactured by BASF Japan)
WAX-1: Release agent based on fatty acid ester (RIKEMAL SL900 (product name), manufactured by Riken Vitamin Co., Ltd.)
WAX-2: Olefin-based waxes produced by copolymerization of alpha-olefin and malenic anhydride (DIACARNA 30M (trade name), manufactured by Mitsubishi chemical Corporation)

TABLE 1

| | Item | Unit | Examples | | | | | | | | | | | | |
| | | | 1 | 2 | 3 | 4 | 5 | 6 | 7 | 8 | 9 | 10 | 11 | 12 | 13 |
|---|---|---|---|---|---|---|---|---|---|---|---|---|---|---|---|
| Composition | A-2 | p.b.w. | 70 | | 80 | 60 | 50 | 70 | 70 | 70 | 70 | 70 | 70 | 70 | 70 |
| | A-3 | " | | 70 | | | | | | | | | | | |
| | B-1 | " | 30 | 30 | 20 | 40 | 50 | | 30 | 30 | 30 | 30 | 30 | 30 | 30 |
| | B-2 | " | | | | | | 30 | | | | | | | |
| | CII-1 | " | 5 | 5 | 5 | 5 | 5 | 5 | 3 | 7 | | | | 5 | 5 |
| | CII-2 | " | | | | | | | | | 5 | | | | |
| | CII-3 | " | | | | | | | | | | 5 | | | |
| | CII-4 | " | | | | | | | | | | | 5 | | |
| | D-1 | " | 10 | 10 | 10 | 10 | 10 | 10 | 10 | 10 | 10 | 10 | 10 | 5 | 15 |
| | D-2 | " | | | | | | | | | | | | | |

TABLE 1-continued

|  |  |  | | | | | | | | | | | | | | |
|---|---|---|---|---|---|---|---|---|---|---|---|---|---|---|---|---|
|  |  | E-1 | " | 0.4 | 0.4 | 0.4 | 0.4 | 0.4 | 0.4 | 0.4 | 0.4 | 0.4 | 0.4 | 0.4 | 0.4 | 0.4 |
|  |  | E-2 | " |  |  |  |  |  |  |  |  |  |  |  |  |  |
|  |  | E-3 | " |  |  |  |  |  |  |  |  |  |  |  |  |  |
|  |  | E-4 | " |  |  |  |  |  |  |  |  |  |  |  |  |  |
|  |  | F | " | 1 | 1 | 1 | 1 | 1 | 1 | 1 | 1 | 1 | 1 | 1 | 1 | 1 |
|  | other | STB-1 | " | 0.1 | 0.1 | 0.1 | 0.1 | 0.1 | 0.1 | 0.1 | 0.1 | 0.1 | 0.1 | 0.1 | 0.1 | 0.1 |
|  |  | STB-2 | " | 0.1 | 0.1 | 0.1 | 0.1 | 0.1 | 0.1 | 0.1 | 0.1 | 0.1 | 0.1 | 0.1 | 0.1 | 0.1 |
|  |  | WAX-1 | " | 0.3 | 0.3 | 0.3 | 0.3 | 0.3 | 0.3 | 0.3 | 0.3 | 0.3 | 0.3 | 0.3 | 0.3 | 0.3 |
|  |  | WAX-2 | " |  |  |  |  |  |  |  |  |  |  |  |  |  |
| Charac- teristics | Appearance of molded articles | | — | Good | Good | Good | Good | Good | Good | Good | Good | Good | Good | Good | Good | Good |
|  | Charpy impact strength | | kJ/m² | 12 | 14 | 15 | 11 | 10 | 9 | 9 | 15 | 11 | 10 | 11 | 15 | 9 |
|  | Flame retardancy (0.7 mm/V) | | — | V-2 | V-2 | V-2 | V-2 | V-2 | V-2 | V-2 | V-2 | V-2 | V-2 | V-2 | V-2 | V-0 |
|  | Flame retardancy (1.5 mm/V) | | — | V-0 | V-0 | V-0 | V-1 | V-1 | V-0 | V-0 | V-1 | V-0 | V-0 | V-0 | V-1 | V-0 |
|  | Flame retardancy(1.8 mm/5 V) | | — | 5VB | 5VB | 5VB | 5VB | 5VB | 5VB | 5VB | 5VB | 5VB | 5VB | 5VB | 5VB | 5VB |
|  | Chemical resistance | | — | Good | Good | Good | Good | Good | Good | Good | Good | Good | Good | Good | Good | Good |

|  |  |  |  | Examples | | | | | | | | | | | |
|---|---|---|---|---|---|---|---|---|---|---|---|---|---|---|---|
|  |  | Item | Unit | 14 | 15 | 16 | 17 | 18 | 19 | 20 | 21 | 22 | 23 | 24 | 25 |
| Compo- sition | | A-2 | p.b.w. | 70 | 70 | 70 | 70 | 70 | 70 | 70 | 70 | 70 | 70 | 70 | 97 |
|  | | A-3 | " |  |  |  |  |  |  |  |  |  |  |  |  |
|  | | B-1 | " | 30 | 30 | 30 | 30 | 30 | 30 | 30 | 30 | 30 | 30 | 30 | 3 |
|  | | B-2 | " |  |  |  |  |  |  |  |  |  |  |  |  |
|  | | CII-1 | " | 5 | 5 | 5 | 5 | 5 | 5 | 5 | 5 | 5 | 5 | 5 | 5 |
|  | | CII-2 | " |  |  |  |  |  |  |  |  |  |  |  |  |
|  | | CII-3 | " |  |  |  |  |  |  |  |  |  |  |  |  |
|  | | CII-4 | " |  |  |  |  |  |  |  |  |  |  |  |  |
|  | | D-1 | " |  | 10 | 10 | 10 | 10 | 10 | 10 | 10 | 10 | 10 | 10 | 10 |
|  | | D-2 | " | 10 |  |  |  |  |  |  |  |  |  |  |  |
|  | | E-1 | " | 0.4 | 1.5 |  |  |  | 0.4 | 0.4 | 0.4 | 0.4 | 0.4 | 0.4 | 0.4 |
|  | | E-2 | " |  |  | 0.4 |  |  |  |  |  |  |  |  |  |
|  | | E-3 | " |  |  |  | 0.4 |  |  |  |  |  |  |  |  |
|  | | E-4 | " |  |  |  |  | 0.4 |  |  |  |  |  |  |  |
|  | | F | " | 1 | 1 | 1 | 1 | 1 | 1 | 1 |  |  | 0.2 | 5 | 1 |
|  | other | STB-1 | " | 0.1 | 0.1 | 0.1 | 0.1 | 0.1 | 0.1 |  | 0.1 |  | 0.1 | 0.1 | 0.1 |
|  |  | STB-2 | " | 0.1 | 0.1 | 0.1 | 0.1 | 0.1 | 0.1 |  | 0.1 |  | 0.1 | 0.1 | 0.1 |
|  |  | WAX-1 | " | 0.3 | 0.3 | 0.3 | 0.3 | 0.3 |  |  | 0.3 |  | 0.3 | 0.3 | 0.3 |
|  |  | WAX-2 | " |  |  |  |  |  |  | 0.3 |  |  |  |  |  |
| Charac- teristics | Appearance of molded articles | | — | Good | Good | Good | Good | Good | Good | Good | Good | Good | Good | Good | Good |
|  | Charpy impact strength | | kJ/m² | 11 | 14 | 12 | 12 | 12 | 11 | 10 | 15 | 15 | 15 | 9 | 25 |
|  | Flame retardancy (0.7 mm/V) | | — | V-2 | V-1 | V-2 | V-2 | V-2 | V-2 | V-2 | V-2 | V-2 | V-2 | V-1 | V-0 |
|  | Flame retardancy (1.5 mm/V) | | — | V-0 | V-0 | V-0 | V-1 | V-0 | V-0 | V-0 | V-1 | V-1 | V-1 | V-0 | V-0 |
|  | Flame retardancy(1.8 mm/5 V) | | — | 5VB | 5VB | 5VB | 5VB | 5VB | 5VB | 5VB | 5VB | 5VB | 5VB | 5VB | 5VB |
|  | Chemical resistance | | — | Good | Good | Good | Good | Good | Good | Good | Good | Good | Good | Good | Poor | p.b.w = parts by weight

TABLE 2

|  |  |  |  | Comparative examples | | | | | | | | |
|---|---|---|---|---|---|---|---|---|---|---|---|---|
|  | | Item | Unit | 1 | 2 | 3 | 4 | 5 | 6 | 7 | 8 | 9 |
| Composition | A-2 | | p.b.w. | 20 | 70 | 70 | 70 | 70 | 70 | 70 | 70 | 70 |
|  | B-1 | | " | 80 | 30 | 30 | 30 | 30 | 30 | 30 | 30 | 30 |
|  | CII-1 | | " | 5 | 0.5 | 15 | 5 | 7 | 5 |  | 5 | 5 |
|  | D-1 | | " | 10 | 10 | 10 | 0.5 | 30 |  |  | 10 | 10 |
|  | D-3 | | " |  |  |  |  |  | 10 |  |  |  |
|  | D-4 | | " |  |  |  |  |  |  | 10 |  |  |
|  | E-1 | | " | 0.4 | 0.4 | 0.4 | 0.4 | 0.4 | 0.4 | 0.4 | 0.01 | 4.0 |
|  | F | | " | 1 | 1 | 1 | 1 | 1 | 1 | 1 | 1 | 1 |
|  | other | STB-1 | " | 0.1 | 0.1 | 0.1 | 0.1 | 0.1 | 0.1 | 0.1 | 0.1 | 0.1 |
|  |  | STB-2 | " | 0.1 | 0.1 | 0.1 | 0.1 | 0.1 | 0.1 | 0.1 | 0.1 | 0.1 |
|  |  | WAX-1 | " | 0.3 | 0.3 | 0.3 | 0.3 | 0.3 | 0.3 | 0.3 | 0.3 | 0.3 |
| Characteristics | Appearance of molded articles | | — | Good | Good | Poor | Good | Good | Good | Good | Good | Poor |
|  | Charpy impact strength | | kJ/m² | 3 | 3 | 30 | 32 | 3 | 20 | 19 | 17 | 20 |
|  | Flame retardancy (0.7 mm/V) | | — | not V | V-0 | not V | not V | V-0 | V-2 | V-2 | not V | V-2 |
|  | Flame retardancy (1.5 mm/V) | | — | not V | V-0 | not V | not V | V-0 | V-0 | V-0 | V-1 | V-0 |
|  | Flame retardancy (1.8 mm/5 V) | | — | not 5 V | 5VB | not 5 V | not 5 V | 5VB | not 5 V | not 5 V | not 5 V | 5VB |
|  | Chemical resistance | | — | Good | Good | Good | Good | Good | Good | Good | Good | Good | p.b.w = parts by weight

TABLE 3

| | Item | Unit | \multicolumn{13}{c}{Examples} |
| | | | 26 | 27 | 28 | 29 | 30 | 31 | 32 | 33 | 34 | 35 | 36 | 37 | 38 |
|---|---|---|---|---|---|---|---|---|---|---|---|---|---|---|---|
| Composition | A-1 | p.b.w. | 100 | | | 100 | 100 | 100 | 100 | 100 | 100 | 100 | 100 | 100 | 100 |
| | A-2 | " | | 100 | | | | | | | | | | | |
| | A-3 | " | | | 100 | | | | | | | | | | |
| | CI-1 | " | 10.0 | 10.0 | 10.0 | 5.0 | 20.0 | | 10.0 | 10.0 | 10.0 | 10.0 | 10.0 | 7.0 | 10.0 |
| | CI-2 | " | | | | | | 10.0 | | | | | | | |
| | CII-1 | " | 3.5 | 3.5 | 3.5 | 3.5 | 3.5 | 3.5 | 2.0 | 7.0 | | | | 3.5 | 3.5 |
| | CII-2 | " | | | | | | | | | 3.5 | | | | |
| | CII-3 | " | | | | | | | | | | 3.5 | | | |
| | CII-4 | " | | | | | | | | | | | 3.5 | | |
| | D-1 | " | 10.0 | 10.0 | 10.0 | 10.0 | 10.0 | 10.0 | 10.0 | 10.0 | 10.0 | 10.0 | 10.0 | 5.0 | 15.0 |
| | D-2 | " | | | | | | | | | | | | | |
| | E-1 | " | 0.4 | 0.4 | 0.4 | 0.4 | 0.4 | 0.4 | 0.4 | 0.4 | 0.4 | 0.4 | 0.4 | 0.4 | 0.4 |
| | E-2 | " | | | | | | | | | | | | | |
| | E-3 | " | | | | | | | | | | | | | |
| | E-4 | " | | | | | | | | | | | | | |
| | F | " | 1.0 | 1.0 | 1.0 | 1.0 | 1.0 | 1.0 | 1.0 | 1.0 | 1.0 | 1.0 | 1.0 | 1.0 | 1.0 |
| other | STB-1 | " | 0.1 | 0.1 | 0.1 | 0.1 | 0.1 | 0.1 | 0.1 | 0.1 | 0.1 | 0.1 | 0.1 | 0.1 | 0.1 |
| | STB-2 | " | 0.1 | 0.1 | 0.1 | 0.1 | 0.1 | 0.1 | 0.1 | 0.1 | 0.1 | 0.1 | 0.1 | 0.1 | 0.1 |
| | WAX-1 | " | 0.3 | 0.3 | 0.3 | 0.3 | 0.3 | 0.3 | 0.3 | 0.3 | 0.3 | 0.3 | 0.3 | 0.3 | 0.3 |
| | WAX-2 | " | | | | | | | | | | | | | |
| Characteristics | Appearance of molded articles | — | Good | Good | Good | Good | Good | Good | Good | Good | Good | Good | Good | Good | Good |
| | Charpy impact strength | kJ/m$^2$ | 25 | 28 | 40 | 40 | 15 | 30 | 15 | 42 | 15 | 15 | 20 | 34 | 15 |
| | Flame retardancy (0.7 mm/V) | — | V-2 | V-2 | V-2 | V-2 | V-2 | V-2 | V-0 | V-2 | V-2 | V-2 | V-2 | V-2 | V-0 |
| | Flame retardancy (1.5 mm/V) | — | V-0 | V-0 | V-0 | V-0 | V-1 | V-0 | V-0 | V-1 | V-0 | V-0 | V-0 | V-1 | V-0 |
| | Flame retardancy (1.5 mm/5 V) | — | 5VB | 5VB | 5VB | 5VB | 5VB | 5VB | 5VB | 5VB | 5VB | 5VB | 5VB | 5VB | 5VB |
| | Fluidity | cm | 35 | 33 | 30 | 27 | 45 | 30 | 37 | 32 | 35 | 35 | 35 | 30 | 45 |

| | Item | Unit | \multicolumn{12}{c}{Examples} |
| | | | 39 | 40 | 41 | 42 | 43 | 44 | 45 | 46 | 47 | 48 | 49 | 50 |
|---|---|---|---|---|---|---|---|---|---|---|---|---|---|---|
| Composition | A-1 | p.b.w. | 100 | 100 | 100 | 100 | 100 | 100 | 100 | 100 | 100 | 100 | 100 | 100 |
| | A-2 | " | | | | | | | | | | | | |
| | A-3 | " | | | | | | | | | | | | |
| | CI-1 | " | 10.0 | 10.0 | 10.0 | 10.0 | 10.0 | 10.0 | 10.0 | 10.0 | 10.0 | 10.0 | 10.0 | 0.5 |
| | CI-2 | " | | | | | | | | | | | | |
| | CII-1 | " | 3.5 | 3.5 | 3.5 | 3.5 | 3.5 | 3.5 | 3.5 | 3.5 | 3.5 | 3.5 | 3.5 | 3.5 |
| | CII-2 | " | | | | | | | | | | | | |
| | CII-3 | " | | | | | | | | | | | | |
| | CII-4 | " | | | | | | | | | | | | |
| | D-1 | " | 15.0 | | 10.0 | 10.0 | 10.0 | 10.0 | 10.0 | 10.0 | 10.0 | 10.0 | 10.0 | 10.0 |
| | D-2 | " | | 10.0 | | | | | | | | | | |
| | E-1 | " | 1.8 | 0.4 | | | | 0.4 | 0.4 | 0.4 | 0.4 | 0.4 | 0.4 | 0.4 |
| | E-2 | " | | | 0.4 | | | | | | | | | |
| | E-3 | " | | | | 0.4 | | | | | | | | |
| | E-4 | " | | | | | 0.4 | | | | | | | |
| | F | " | 1.0 | 1.0 | 1.0 | 1.0 | 1.0 | 1.0 | 1.0 | | | 0.2 | 5.0 | 1.0 |
| other | STB-1 | " | 0.1 | 0.1 | 0.1 | 0.1 | 0.1 | 0.1 | | 0.1 | | 0.1 | 0.1 | 0.1 |
| | STB-2 | " | 0.1 | 0.1 | 0.1 | 0.1 | 0.1 | 0.1 | | 0.1 | | 0.1 | 0.1 | 0.1 |
| | WAX-1 | " | 0.3 | 0.3 | 0.3 | 0.3 | 0.3 | | | 0.3 | | 0.3 | 0.3 | 0.3 |
| | WAX-2 | " | | | | | | 0.3 | | | | | | |
| Characteristics | Appearance of molded articles | — | Good | Good | Good | Good | Good | Good | Good | Good | Good | Good | Good | Good |
| | Charpy impact strength | kJ/m$^2$ | 27 | 25 | 25 | 25 | 25 | 25 | 20 | 28 | 26 | 32 | 15 | 50 |
| | Flame retardancy (0.7 mm/V) | — | V-2 | V-2 | V-2 | V-2 | V-2 | V-2 | V-2 | V-2 | V-2 | V-2 | V-1 | V-0 |
| | Flame retardancy (1.5 mm/V) | — | V-0 | V-0 | V-0 | V-0 | V-0 | V-0 | V-1 | V-1 | V-1 | V-0 | V-0 | V-0 |
| | Flame retardancy (1.5 mm/5 V) | — | 5VB | 5VB | 5VB | 5VB | 5VB | 5VB | 5VB | 5VB | 5VB | 5VB | 5VB | 5VB |
| | Fluidity | cm | 31 | 31 | 35 | 35 | 35 | 35 | 37 | 36 | 36 | 36 | 32 | 20 | p.b.w = parts by weight

TABLE 4

| | Item | Unit | \multicolumn{9}{c}{Comparative examples} |
| | | | 10 | 11 | 12 | 13 | 14 | 15 | 16 | 17 | 18 |
|---|---|---|---|---|---|---|---|---|---|---|---|
| Composition | A-1 | p.b.w. | 100 | 100 | 100 | 100 | 100 | 100 | 100 | 100 | 100 |
| | CI-1 | " | 40.0 | 10.0 | 10.0 | 10.0 | 10.0 | 10.0 | 10.0 | 10.0 | 10.0 |
| | CII-1 | " | 3.5 | 0.5 | 15.0 | 3.5 | 7.0 | 3.5 | 3.5 | 3.5 | 3.5 |
| | D-1 | " | 10.0 | 10.0 | 10.0 | 0.5 | 30.0 | | | 10.0 | 10.0 |
| | D-3 | " | | | | | | 10.0 | | | |
| | D-4 | " | | | | | | | 10.0 | | |
| | E-1 | " | 0.4 | 0.4 | 0.4 | 0.4 | 0.4 | 0.4 | 0.4 | 0.01 | 40 |
| | F | " | 1.0 | 1.0 | 1.0 | 1.0 | 1.0 | 1.0 | 1.0 | 1.0 | 1.0 |

TABLE 4-continued

|  | Item | Unit | Comparative examples | | | | | | | | |
|---|---|---|---|---|---|---|---|---|---|---|---|
|  |  |  | 10 | 11 | 12 | 13 | 14 | 15 | 16 | 17 | 18 |
| other | STB-1 | " | 0.1 | 0.1 | 0.1 | 0.1 | 0.1 | 0.1 | 0.1 | 0.1 | 0.1 |
|  | STB-2 | " | 0.1 | 0.1 | 0.1 | 0.1 | 0.1 | 0.1 | 0.1 | 0.1 | 0.1 |
|  | WAX-1 | " | 0.3 | 0.3 | 0.3 | 0.3 | 0.3 | 0.3 | 0.3 | 0.3 | 0.3 |
| Characteristics | Appearance of molded articles | " | Poor | Good | Poor | Good | Good | Good | Good | Good | Poor |
|  | Charpy impact strength | kJ/m$^2$ | 4 | 3 | 45 | 46 | 5 | 25 | 24 | 25 | 35 |
|  | Flame retardancy (0.7 mm/V) | — | not V | V-0 | not V | not V | V-0 | V-2 | V-2 | not V | V-2 |
|  | Flame retardancy (1.5 mm/V) | — | not V | V-0 | not V | not V | V-0 | V-0 | V-0 | V-1 | V-0 |
|  | Flame retardancy (1.5 mm/5 V) | — | not 5 V | 5VB | not 5 V | not 5 V | 5VB | not 5 V | not 5 V | not 5 V | 5VB |
|  | Fluidity | cm | 70 | 38 | 30 | 22 | 47 | 35 | 35 | 37 | 28 | p.b.w = parts by weight

The invention claimed is:

1. A flame-retardant polycarbonate resin composition characterized in that it comprises, based on 100 parts by weight of a resin component consisting of (A) 40 to 100 parts by weight of a polycarbonate resin (component A) and (B) 60 to 0 parts by weight of a polyester resin (component B),
- (CI) 0 to 30 parts by weight of a polymer obtained by polymerizing at least one selected from the group consisting of an aromatic vinyl monomer, a vinyl cyanide monomer, and an alkyl (meth) acrylate monomer (component CI),
- (CII) 1 to 10 parts by weight of an impact modifier other than the component CI (component CII),
- (D) 1 to 20 parts by weight of phosphazene having 98.5 mol % or more of phosphazene cyclic trimer (component D), and
- (E) 0.05 to 2 parts by weight of a dripping inhibitor (component E).

2. The flame-retardant polycarbonate resin composition according to claim 1, wherein the resin component consists of (A) 40 to 95 parts by weight of a polycarbonate resin (component A) and (B) 60 to 5 parts by weight of a polyester resin (component B).

3. The flame-retardant polycarbonate resin composition according to claim 1, wherein it comprises 1 to 30 parts by weight of the component CI, based on 100 parts by weight of the resin component.

4. The flame-retardant polycarbonate resin composition according to claim 1, characterized in that the component CII is a graft copolymer obtained by graft polymerization of at least one compound containing (meth) acrylic ester compound to a rubber selected from the group consisting of a butadiene-based rubber, an acrylic rubber and a silicone-acrylate composite rubber.

5. The flame-retardant polycarbonate resin composition according to claim 1, characterized in that it comprises (F) 0.1 to 50 parts by weight of a silicate mineral (component F), based on 100 parts by weight of the resin composition.

6. A molded article formed of the flame-retardant polycarbonate resin composition according to claim 1.

* * * * *